United States Patent
Bortnikov et al.

(10) Patent No.: US 10,838,875 B2
(45) Date of Patent: Nov. 17, 2020

(54) SYSTEM AND METHOD FOR MANAGING MEMORY FOR LARGE KEYS AND VALUES

(71) Applicant: Oath Inc., New York, NY (US)

(72) Inventors: Edward Bortnikov, Haifa (IL); Anastasia Braginsky, Haifa (IL); Idit Keidar, Haifa (IL); Dmitry Basin, Haifa (IL); Hagar Meir, Haifa (IL); Eshcar Hillel, Binyamina (IL); Gali Sheffi, Kiryat Bialik (IL)

(73) Assignee: Oath Inc., New York, NY (US)

( * ) Notice: Subject to any disclaimer, the term of this patent is extended or adjusted under 35 U.S.C. 154(b) by 0 days.

(21) Appl. No.: 16/033,311

(22) Filed: Jul. 12, 2018

(65) Prior Publication Data
US 2019/0347211 A1    Nov. 14, 2019

Related U.S. Application Data

(60) Provisional application No. 62/670,001, filed on May 11, 2018.

(51) Int. Cl.
*G06F 12/00* (2006.01)
*G06F 12/1018* (2016.01)

(52) U.S. Cl.
CPC .. *G06F 12/1018* (2013.01); *G06F 2212/1041* (2013.01)

(58) Field of Classification Search
None
See application file for complete search history.

(56) References Cited

U.S. PATENT DOCUMENTS

| | | | |
|---|---|---|---|
| 9,436,596 B2* | 9/2016 | Sengupta | G06F 12/0866 |
| 2012/0222005 A1* | 8/2012 | Harris | G06F 9/45504 717/120 |
| 2015/0169610 A1* | 6/2015 | Lee | H04L 67/1097 707/693 |
| 2016/0092466 A1* | 3/2016 | Raja | G06F 16/182 707/742 |
| 2018/0025047 A1 | 1/2018 | Bortnikov et al. | |

OTHER PUBLICATIONS

The Apache Software Foundation, "Managing Off-Heap Memory", 2017, Apache Geode Documentation (Year: 2017).*
Swapnil Bawaskar, "Look ma, No JVM pauses!", Jun. 4, 2017, Medium (Year: 2017).*

* cited by examiner

*Primary Examiner* — Reginald G Bragdon
*Assistant Examiner* — Michael L Westbrook
(74) *Attorney, Agent, or Firm* — Pillsbury Winthrop Shaw Pittman LLP

(57) ABSTRACT

Methods, systems, and programming for accessing data are described herein. In a non-limiting embodiment, a request associated with a key may be received. A memory chunk in a first memory site associated with the key may be located. An entry in the memory chunk corresponding to the key may be determined. A first pointer to the key corresponding to a first location of the key within a buffer at a second memory site may be obtained from the entry. The key stored at the first location may be retrieved from the buffer at the second memory site.

20 Claims, 20 Drawing Sheets

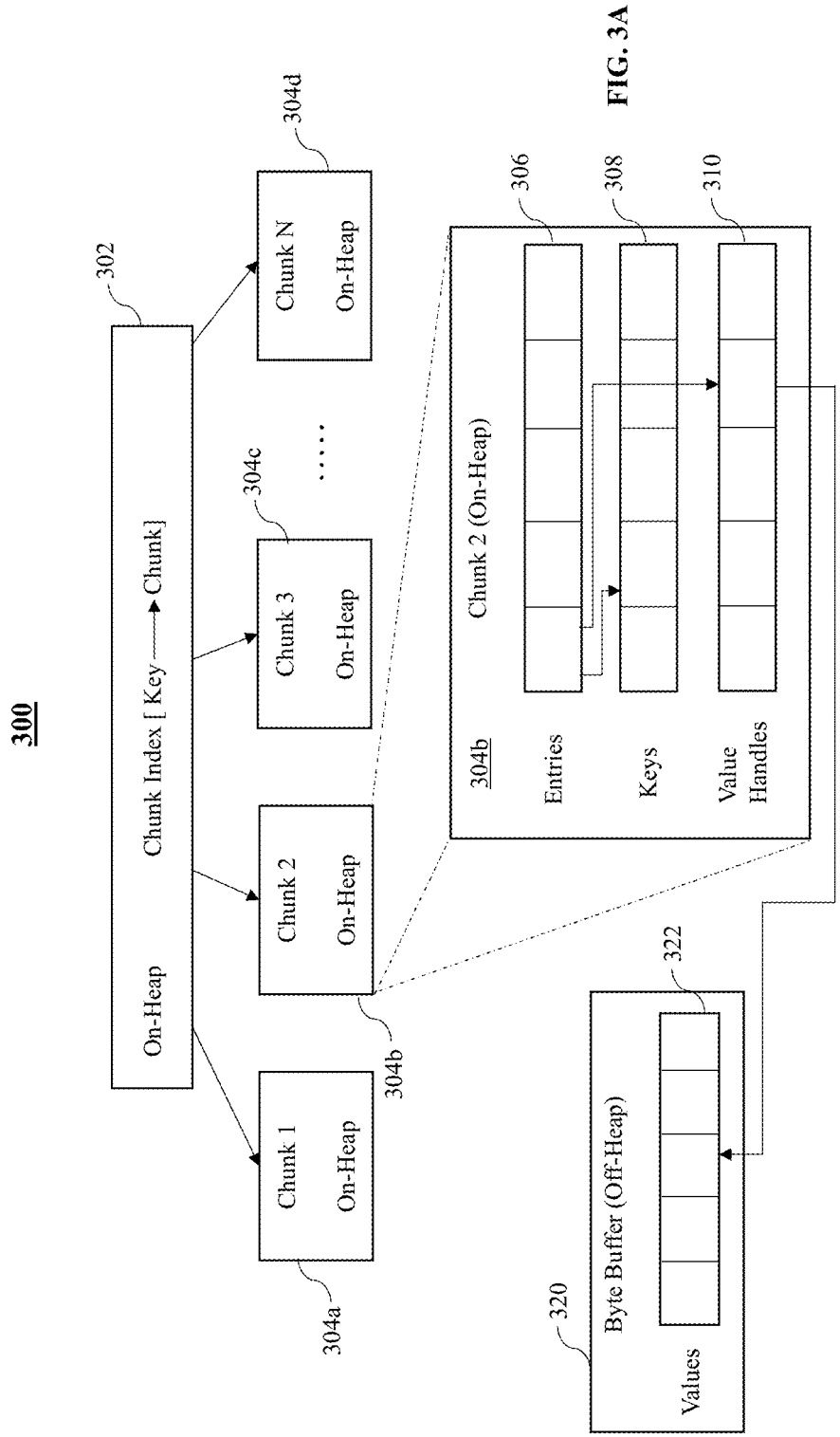

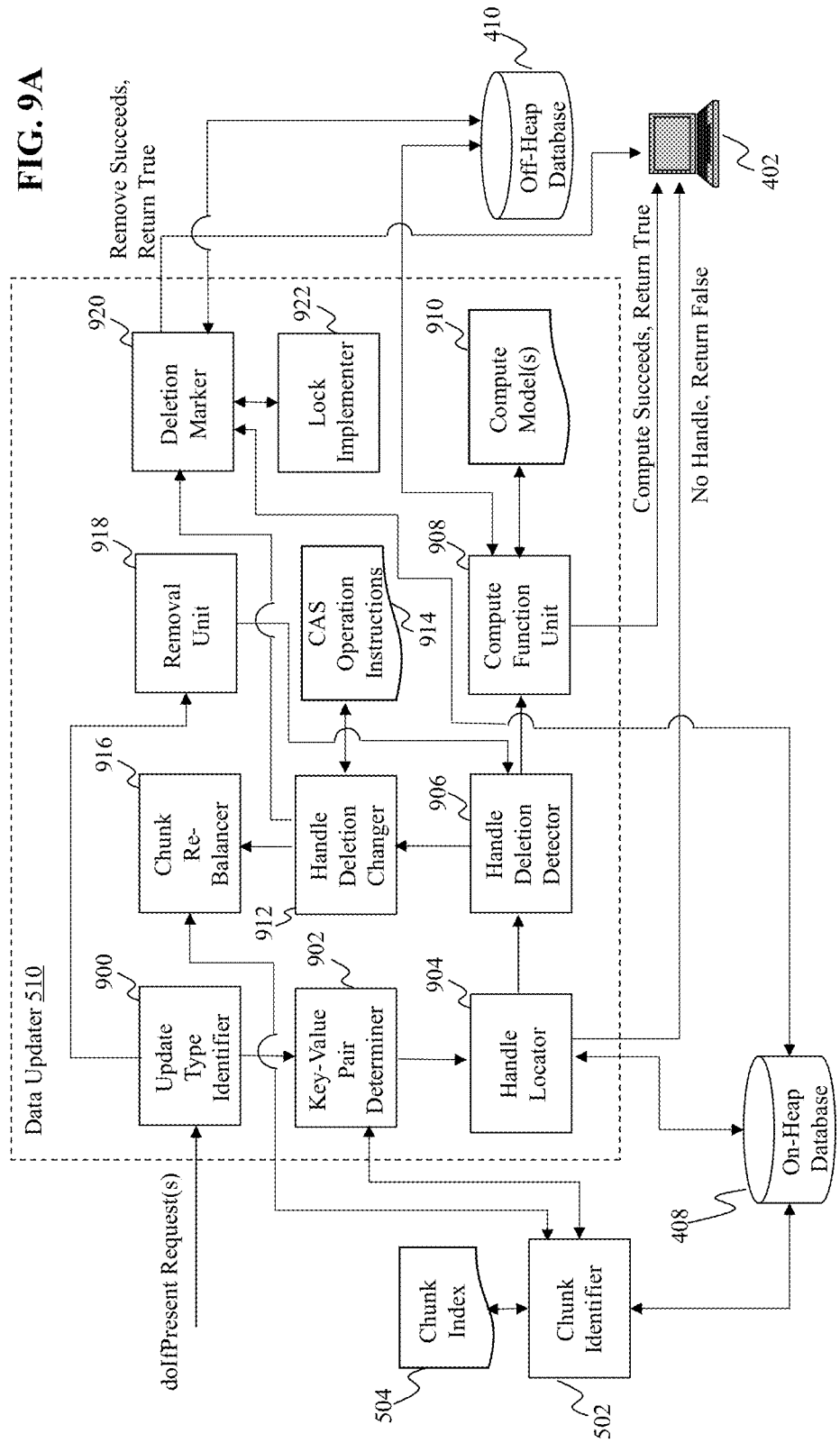

SYSTEM AND METHOD FOR MANAGING MEMORY FOR LARGE KEYS AND VALUES

CROSS-REFERENCE TO RELATED APPLICATION

This application claims the benefit of commonly-assigned U.S. Provisional Patent Application No. 62/670,001, entitled "A Key-Value Map for Big Data Analytics," which was filed on May 11, 2018, and the disclosure of which is incorporated herein by reference in its entirety.

BACKGROUND

1. Technical Field

The present teaching generally relates to key-value stored. More specifically, the present teaching relates to systems, methods, and programming for managing key-value stored for large keys and/or values.

2. Technical Background

As data analytics increases in prevalence throughout society, the use of real-time data analytics applications has also increased. Such applications need to support both updates and queries within a same system. The use of a same system for both updates and queries differs from previous applications whereby data acquisition and data analysis processes were facilitated by different systems. However, this approach can lead to increased operational costs, increased maintenance needs, as well as increased computing latency.

While analysis tools, such as analysis tools for mobile developers, are available, such tools make use of existing key-value maps like Druid to store keys and values. In Druid, the keys and the values may be large. For example, large keys may correspond to keys encompassing multiple data dimensions, and large values may correspond to values that are composites (e.g., quantile distributions). Due to the large size of keys and/or values in Druid, most updates modify values of existing keys. Furthermore, scans (e.g., ascending/descending) are not required to be atomic.

Although efforts have been made to develop efficient concurrent data structures, most are not organized using key-value pairs. Furthermore, such efforts do not allow for certain functions desirable to developers and analytics support applications such as, and without limitation, update-in-pace, conditional puts, and descending iterators. Additionally, even those efforts that due employ key-value are unable to support large, variable-size, keys and/or values; or these efforts are unable to support general objects as keys and values and implement a full API.

Thus, there is a need for methods and systems to develop and maintain a key-value data store that allows for large, variable-size, keys and/or values, as well offers support for set of APIs.

SUMMARY

The teachings disclosed herein relate to methods, systems, and programming for accessing data. More particularly, the present teaching relates to methods, systems, and programming related to performing database operations for data stored in a first memory site and/or a second memory site.

In one example, a method for accessing data implemented on at least one machine comprising at least one processor, memory, and a communication platform connected to a network is described. In one embodiment, a request associated with a key may be received. A memory chunk in a first memory site associated with the key may be located. An entry in the memory chuck corresponding to the key may be determined. A first pointer to the key corresponding to a first location of the key within a buffer at a second memory site may be obtained from the entry. The key stored at the first location may be retrieved from the buffer at the second memory site.

In one example, a system for accessing data is described. The system may include a request classifier configured to receive a request associated with a key; a chunk locator configured to locate a memory chunk in a first memory site associated with the key; and an entry search configured to: determine an entry in the memory chunk corresponding to the key, obtain, from the entry, a first pointer to the key corresponding to a first location of the key within a buffer at a second memory site, and retrieve, form the buffer at the second memory site, the key stored at the first location.

Other concepts relate to software for implementing the present teaching on accessing data. A software product, in accord with this concept, includes at least one machine-readable non-transitory medium and information and/or instructions stored thereon. The instructions stored on the medium may include executable program code data, parameters in association with the executable program code, and/or information related to a user, a request, content, and/or information related to updating a search index.

In one example, a machine-readable, non-transitory and tangible medium having one or more computer programs for accessing data is described. The one or more computer programs, when executed by at least one processor of a machine, cause the machine to receive a request associated with a key; locate a memory chunk in a first memory site associated with the key; determine an entry in the memory chuck corresponding to the key; obtain, from the entry, a first pointer to the key corresponding to a first location of the key within a buffer at a second memory site; and retrieve, from the buffer at the second memory site, the key stored at the first location may be retrieved from the buffer at the second memory site.

Additional novel features will be set forth in part in the description that follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIGS. 3A and 3B are illustrative diagrams of additionally exemplary key-value data stores, in accordance with various embodiments of the present teaching;

FIG. 9A is an illustrative diagram of an exemplary data updater, in accordance with various embodiments of the present teaching;

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The present teaching aims to eliminate the limitations of associated with previous key-value data stores and systems for developing and maintaining such key-value data stores. More specifically, the present teaching aims to describe systems, methods, and programming that allows for key-value stores to manage large keys and values, perform a full range of functions, and support concurrency.

Existing key-value data stores have keys (and values) stored within on-heap memory. In a Java Virtual Machine ("JVM") that is shared amongst all JVM threads, on-heap memory and off-heap memory correspond to different portions of the JVM. Data stored within on-heap memory, in this example, is subject to garbage collection rules whereas data stored within off-heap memory is not subject to garbage collection. Furthermore, generally speaking, the amount of off-heap memory capable of being allocated to store keys and values is larger than the amount of on-heap memory capable of being allocated. This makes the process of moving data objects (e.g., keys, values) to off-heap memory storage desirable. Additionally, the Java memory management is a slow—an undesirable train in the fast-paced data analytics world.

However, there are certain reasons why moving data object storage to off-heap memory can be challenging. For example, all of the API functions associated with Java memory management schemes are available on-heap, whereas they may not be available off-heap. If data is moved off-heap, these API functions availability and functionality would need to be resolved.

Figure 1:
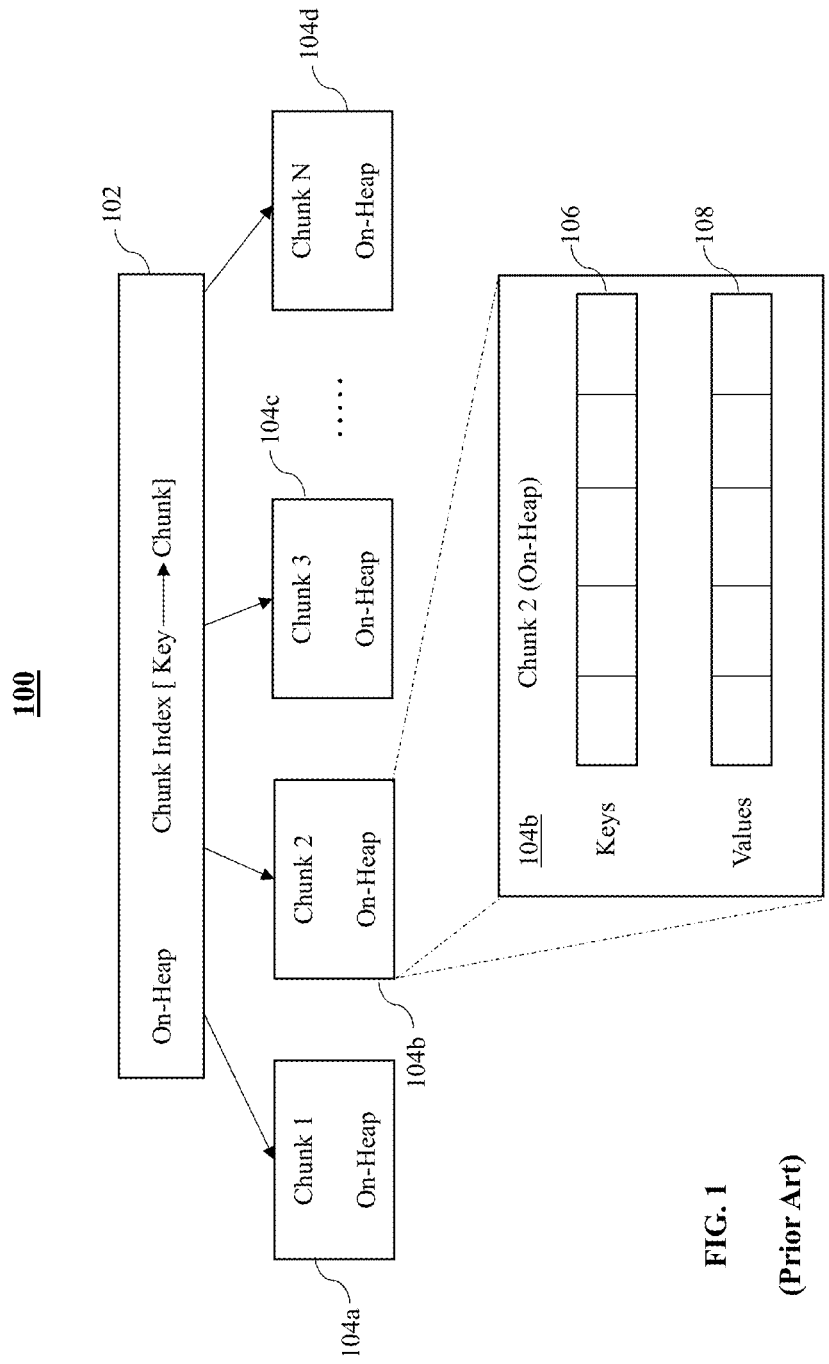
FIG. 1 is an illustrative diagram of a prior-art key-value data store.

FIG. 1 is an illustrative diagram of a prior-art key-value data store. Data store 100 may be organized as blocks of memory, or "chunks," represented within FIG. 1 by chunks 104a-104d. Each memory chunk includes a range of keys with which that chunk stores, or stores associated data. The chunks may be organized in a linked-list of contiguous key ranges. For example, chunk 104a may store keys 0-X; chunk 104b may store keys (X+N)–(X+M), and so on. In this example, X, N, and M may each be keys having a particular representation, which may be numerical however, this is not required. Chunks 104a-d may be organized within their linked-list by a chunk's minimal key, which may be invariant throughout the chunk's lifespan. Furthermore, and as described below, chunks may go through a rebalancing maintenance procedure.

Data store 100, in the illustrative embodiment, includes a chunk index 102. Chunk index 102 may include an index (e.g., a relational database) that indicates, for a given input key, a memory chunk with which that key resides. For instance, if an operation associated with a given key—"key 1"—is received, then chunk index 102 may be used to determine which memory chunk 104 holds that key.

As seen within FIG. 1, each memory chunk 104a-d of data store 100, as well as chunk index 102, is located on-heap (e.g., stored within on-heap memory). In this particular scenario, this means that the memory of data store 100 is subject to garbage collection rules. When a data object, such as a key and/or value, is no longer in use, garbage collection processes reclaim the memory allocated for that key and/or value and reuses that memory for future data object allocation (e.g., future keys/values).

FIG. 1 further illustrates an exploded view of an exemplary memory chunk 104b of data store 100. Each of memory chunks 104a-d may be organized in a similar manner to that of memory chunk 104b, and the selection of memory chunk 104b is merely illustrative. Memory chunk 104a may include keys 106 and values 108. As mentioned above, as memory chunk 104b resides within on-heap memory, keys 106 and values 108 therefore also reside within on-heap memory. This implies that keys 106 and values 108 are subject to garbage collection rules associated with JVM memory management.

As mentioned previously, while on-heap memory does have certain advantages, as keys and values increase in size (e.g., both the size of a key and a value increase, as well as the number of keys and values increase), the memory allocation restrictions and performance associated with on-heap memory management detracts from a data stores performance. To overcome these issues, an improved concurrent memory management system and data store are described herein that supports the use of large keys and values and supports the various API functions available, such as get, put, and remove. Additionally API functions are also described herein.

To address the first issue mentioned above, the present teachings describe a data store that implements a zero-copy policy for updating values. Furthermore, off-heap memory allocation of keys and values is also supported, as well as is memory reclamation of keys and values. To address the second issue mentioned above, the present teachings describe a data store that supports—in addition to the standard get, put, and remove operations—updates to a value in-place, referred to herein as "compute." This compute process is applied at most one-time atomically, as opposed to other compute operations that exist. Additionally, the present teachings describe a data store that does not require a user function to return a computed value due to the computation process being in-place, thus making the newly computed value accessibly right away. The data store described herein additionally allows for and supports concurrency control, as well as supports ascending and descending scans.

To facilitate the improvements of the present teachings, updates of values associated with keys may be done in-place. By doing so, copying data first is avoided and multiple threads to query and update a same key may be accomplished concurrently. Accomplishing this task may be done via value handles. In one embodiment, each value has its own handle, and every read and/or write operation associated with a value may be directed to that value's handle. The value handle may be provided with a same interface as a Java ByteBuffer, which also enables atomicity. The handle may also be employed to support concurrency control, such as via a read-write lock. For off-heap memory, the value handle may perform the memory management associated with that handle's corresponding value.

A user function for compute operations receives a view of the value's handle to run the computation on the value "in-place," eliminating any contention that may arise without concurrency control. Furthermore, get operations do not return the value, as typically done by other techniques, but instead returns a view of the value's handle. If a handle is removed, then that handle ensures that no other read attempts on this value occur as the off-heap memory associated with that value is reclaimed. Additional details regarding the operations of the data store of the present teaching is described below.

Figure 2:
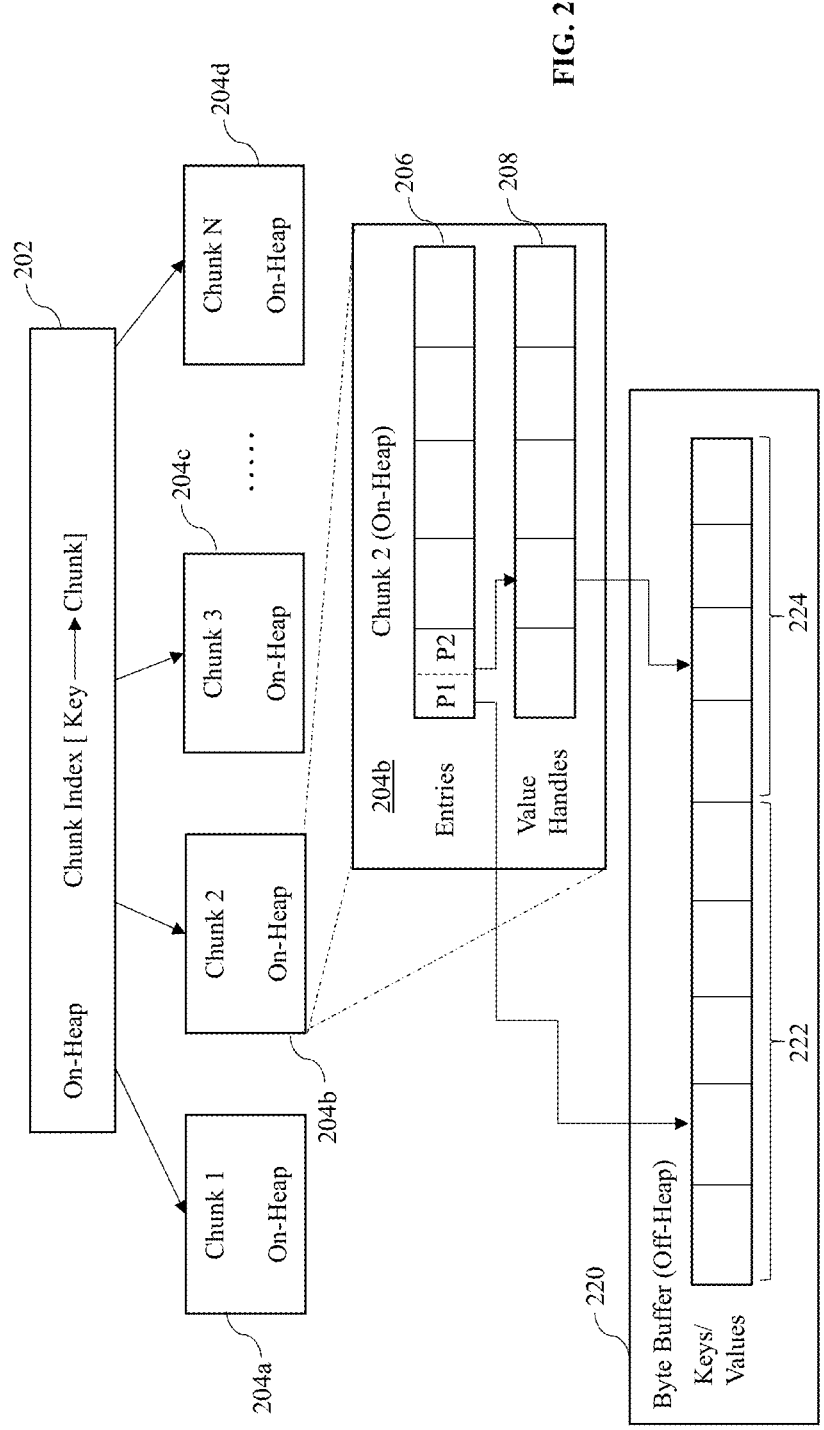
FIG. 2 is an illustrative diagram of an exemplary key-value data store, in accordance with various embodiments of the present teaching.

FIG. 2 is an illustrative diagram of an exemplary key-value data store, in accordance with various embodiments of the present teaching. Data store 200, in the illustrative embodiment, includes a chunk index 202. Chunk index 202 may be stored within on-heap memory. Chunk index 202 may be configured to map keys to memory chunks. Chunk index 202 may index memory chunks by a minimal key held by that particular chunk. Furthermore, chunk index 202 may support certain operations such as, and without limitation, such as locating a relevant chunk, identifying and returning a memory chunk having a greatest minimal key that is lower than a given key (for descending scan operations), and insert and removal processes. Chunk index 202 may be substantially similar to chunk index 102 of FIG. 1, and the previous description may apply.

Data store 200 may further include memory chunks 204a-d. As described referred to herein collectively as memory chunks 204, and individually as memory chunk 204. Any number of memory chunks may be included within data store 200. Furthermore, each memory chunk 204 may include, in one embodiment, data objects such as an array of entries 206 and value handles 208. In other embodiments, as described in FIGS. 3A and 3B, a memory chunk may include additional data objects, including keys and/or values. In the illustrative embodiment, memory chunks 204a-d are located within a first memory site, such as within on-heap memory. Thus, in FIG. 2, entry array 206 and value handles 208 are also stored within the first memory site (e.g., within on-heap memory).

Each entry within entry array 206 may include two pointers: P1 and P2. The first pointer, P1, may be structured to point to a key associated with that entry. The key may be stored within a second memory site 220, such as an off-heap ByteBuffer. Pointer P1 may include a reference to a location of that entry's corresponding key within second memory site 220. For example, in the illustrative embodiment, pointer P1 may point to a key within a portion 222 of second memory site 220 that is configured to store keys. As keys may be variable in size, and thus the amount of memory accounted for by a particular key may vary, pointer P1 points to the beginning of the key within memory site 220, and in particular, portion 222 of memory site 220, as well as including information indicating a size of the key. The second pointer, P2, may be structured to point to a handle for a value associated with that entry's key. Second pointer P2, therefore, may include a reference to a location of its entry's corresponding key's value handle within value handles 208. Additionally, each entry may also include an index of an entry that holds the next key within entry array 206.

Each memory chunk 204 may be configured to perform a rebalancing procedure. The rebalancing procedure facilitates balance within each chunk such that a single chunk is neither overpopulated nor underpopulated. A more detailed explanation of the rebalancing procedure is described in commonly assigned U.S. patent application Ser. No. 15/214,901, filed on Jul. 20, 2016, the disclosure of which is incorporated herein by reference in its entirety.

Each value handle 208, in the example embodiment, is operable to manage synchronization and memory management for a particular value associated therewith. Each value handle is associated with one value, stored within a portion 224 of second memory site 220. Therefore, a value handle includes a reference to a location of its corresponding value within portion 224. Although a single array is shown within FIG. 2 for storing keys and values, multiple arrays may be employed. Additionally, keys and values may be interspersed with one another, in particular prior to rebalancing, as new keys and new values may be added at quasi-random locations within second memory site 220. All operations, such as reads and updates, associated with a value may be performed via the handle, which in one embodiment includes its own interface. In particular, a reading ByteBuffer interface for a handle and a writing ByteBuffer interface for the handle may be defined. The reading and writing ByteBuffer interfaces for the handle may be generated upon a request for a corresponding operation to occur, and may no longer exist upon completion of the corresponding operation.

Figure 3B:
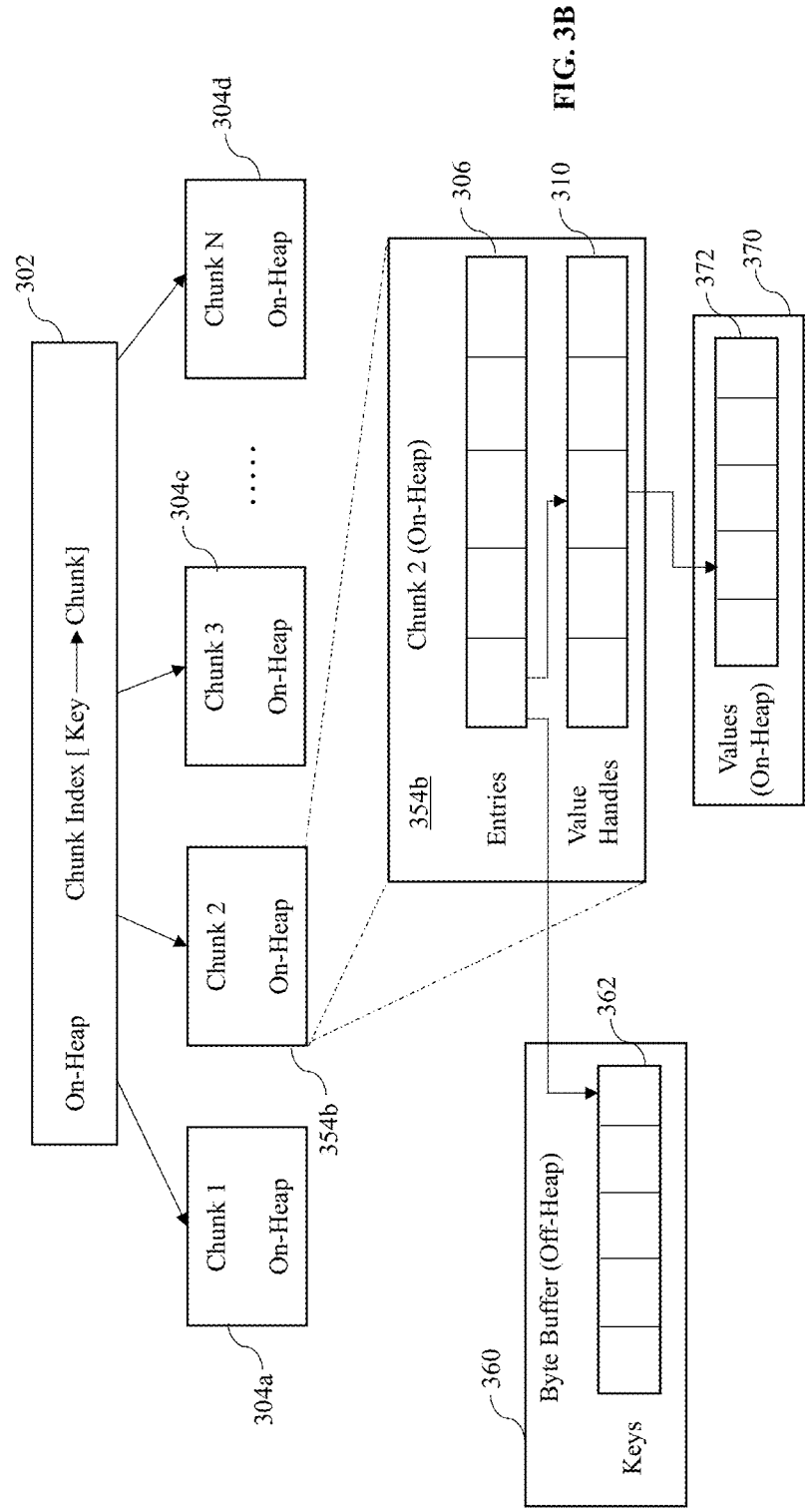

FIGS. 3A and 3B are illustrative diagrams of additionally exemplary key-value data stores, in accordance with various embodiments of the present teaching. In FIG. 3A, a key value store 300 is illustrated including a chunk index 302 and memory chunks 304a-d. In some embodiments, chunk index 302 and memory chunks 304a-d may be substantially similar to chunk index 202 and memory chunks 204a-d of FIG. 2, and the previous description may apply. In FIG. 3A, however, in additional to a memory chunk 304b including an entry array 306 and value handles 310 (e.g., an array of value handles), memory chunk 304b may also include an array of keys 308. In this particular scenario, an entry within entry array 306 may include a first pointer P1 that points to a location of a corresponding key within key array 308, as well as including a second pointer P2 to a location of that key's corresponding value handle 310. Data store 300 may further include a second memory site 320, which may be substantially similar to second memory site 220 of FIG. 2. Second memory site 320, in the illustrative embodiment, may include a value array 322 configured to store values for keys.

In FIG. 3B, another data store 350 is illustrated. Data store 350 may be substantially similar to data stores 200 and 300, with the exception that data store 350 may have keys stored within a second memory site 360 and values stored in a first memory site 370. In this particular example, data store 350 includes chunk index 302 and memory chunks 304a, 304c, 304d, and 354b. Chunk 354b, in one embodiment, may be substantially similar to chunk 304b in that both include an entry array 306 and an array of value handles 310 stored within a first memory site, such as within on-heap memory. Each entry within entry array 306, in the illustrative embodiment, may include a first pointer P1 and a second pointer P2. First pointer P1 may point to a location of a key associated with that entry, where the key may be stored within a second memory site 360, such as off-heap memory. In particular, pointer P1 may indicate a location of the key within a key array 362 stored within second memory site 360, which may in one embodiment correspond to an off-heap ByteBuffer. Second pointer P2 may pointer to a location of that key's corresponding value handle within value handle array 310. The value handle may then, itself, reference a corresponding value within a value array 372 stored within memory site 370. In one embodiment, memory site 370 may correspond to on-heap memory, similar to that of memory chunks 304a, 354b, 304c, and 304d.

Figure 4A:
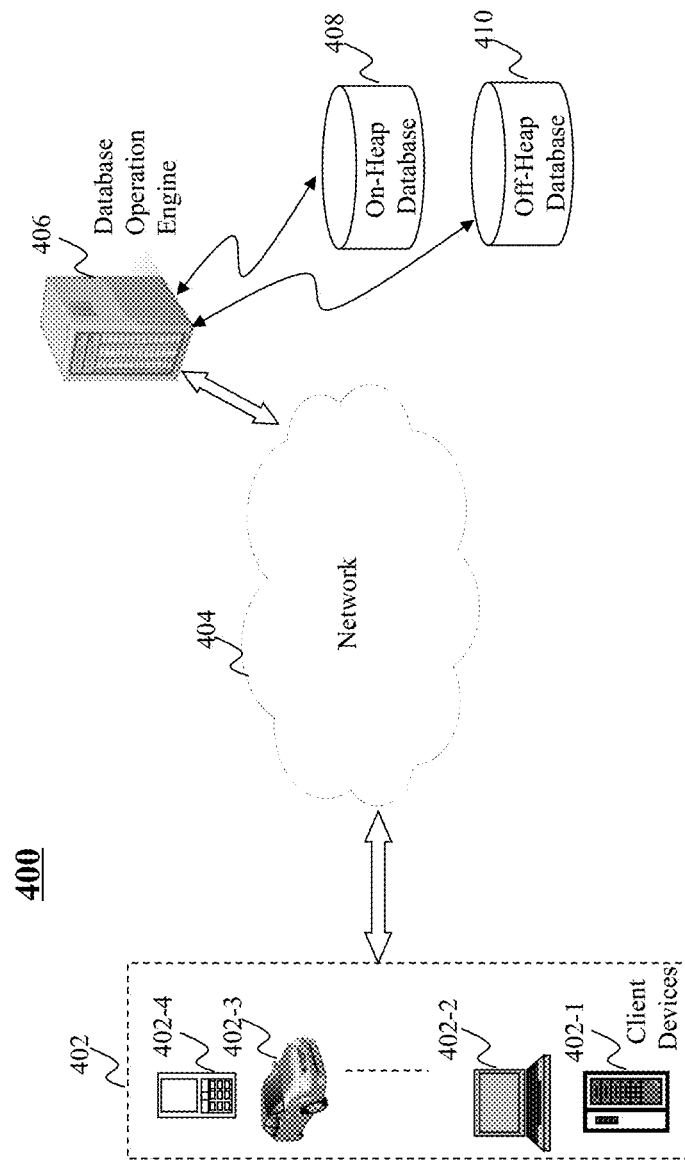
FIGS. 4A and 4B are illustrative diagrams of exemplary networked environments, in accordance with various embodiments of the present teaching.
Figure 4B:
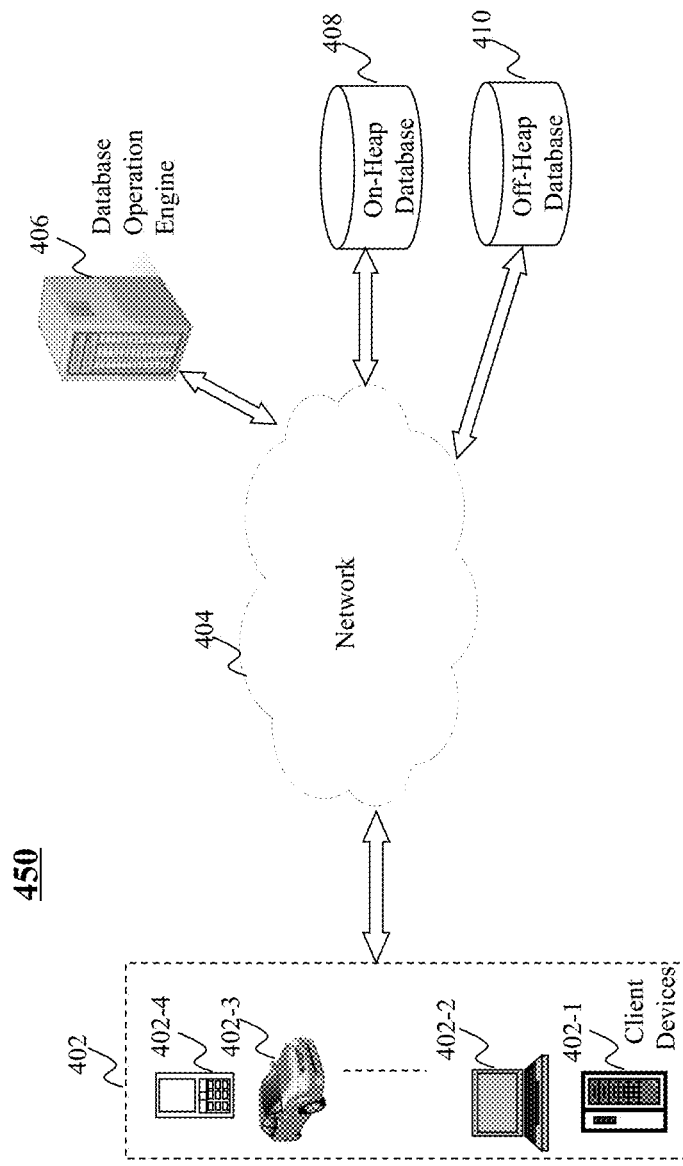

FIGS. 4A and 4B are illustrative diagrams of exemplary networked environments, in accordance with various embodiments of the present teaching. In FIG. 1A, an exemplary networked environment 400 for performing database operations is described. Exemplary networked environment 400 may include one or more user devices 410, such as user devices 402-1, 402-2, 402-3, and 402-4 and a database operation engine 406, which may communicate with one another via one or more networks 404. Additionally, networked environment 400 may include an on-heap database 408 and an off-heap database 410, structured to store data within on-heap memory and off-heap memory, respectively.

Network(s) 404, in some embodiments, may correspond to a single network or a combination of different networks. For example, network(s) 404 may be a local area network ("LAN"), a wide area network ("WAN"), a public network, a private network, a proprietary network, a Public Telephone Switched Network ("PSTN"), the Internet, an intranet, a wireless network, a virtual network, and/or any combination thereof. In one embodiment, network(s) 404 may also include various network access points. For example, environment 400 may include wired and/or wireless access points such as, and without limitation, base stations or Internet exchange points. Base stations may facilitate, for example, communications to/from user device(s) 402 and/or database operation engine 406 with one another as well as, or alternatively, one or more other components of environment 400 across network(s) 404.

User devices 402 may be of different types to facilitate one or more users operating user devices 402 to connect to network(s) 404. User devices 402 may correspond to any suitable type of electronic/computing device including, but not limited to, desktop computers 402-1, mobile devices 402-4 (e.g., mobile phones, smart phones, personal display devices, personal digital assistants ("PDAs"), gaming consoles/devices, wearable devices (e.g., watches, pins/broaches, headphones, etc.), transportation devices 402-3 (e.g., cars, trucks, motorcycles, boats, ships, trains, airplanes), mobile computers 402-2 (e.g., laptops, ultrabooks), smart devices (e.g., televisions, set top boxes, smart televisions), smart household devices (e.g., refrigerators, microwaves, etc.), and/or smart accessories (e.g., light bulbs, light switches, electrical switches, etc.). A user, in one embodiment, may send data (e.g., a query) and/or receive data (e.g., a response) via user devices 402.

Databases 408 and 410 may include a plurality of data (e.g., keys, value, value handles, entries, etc.). The data may be stored within one or more of databases 408 and 410 using data structures represented by data stores 200, 300, and 350, as described above with reference to FIGS. 2, 3A, and 3B, respectively. User devices 402 may be used to transmit a plurality of requests for database operations concurrently to database operation engine 406 via network(s) 404. Each of the plurality of requests may be one of a data view operation, a data insertion operation, and/or a data update operation.

The data view operation may be associated with a request to view, either via a get or scan operation, one or more keys/values. In one embodiment, a scan request may submitted from user device 402 to database operation engine 406 to retrieve all values of a range of keys. In an embodiment, the scan request may specify a maximal key and a minimal key. Accordingly, the scan request is to retrieve all values of the keys between the maximal key and the minimal key. In one embodiment, a get request may be submitted form user device 402 to database operation engine 406 to retrieve a value associated with a key specified in the get request.

The data insertion operation may be associated with a request to insert a key and/or value into one or more of databases 408 and 410. The insertion request may be associated with a particular key, such that a value associated with that key may be inserted within a value array of database 408 or 410. The insertion request may additionally or alternatively be to insert a key into one of databases 408 and 410, depending on whether the key already exists or not. In some embodiments, the insertion request may be provided with a specified key and value (e.g., key-value pair).

The data update operation may be associated with a request to update a key and/or value already located within one or more of databases 408 and 410. The update operation may be associated with a particular key and value, such that a modification to the value for a particular key will occur. In some embodiments, the request may include the key, the value associated with the key, and a function to be performed to the value. In some embodiments, the request may be to remove/delete a key-value pair, a value, or a key. Typically, the update operations are performed on keys/values that already exist within databases 408 and/or 410.

Database operation engine 406 may receive a plurality of requests concurrently or within the predetermined short period of time, access databases 408 and/or 410 directly, and perform a corresponding operation concurrently with respect to databases 408 and/or 410. Further, database operation engine 406 may transmit data back to a requesting one or more user devices 402 in response to each data operation, however not all operations require a response to be provided. Additionally or alternatively, database operation engine 406 may transmit a confirmation in response to a request, such as in response to an insertion request.

Networked environment 450 of FIG. 4B, in one illustrative embodiment, may be substantially similar to networked environment 400 of FIG. 4A, with the exception that except that databases 408 and 410 may be directly connected to the network. This is configured such that multiple database operation engines 406 may be able to access databases 408 and 410 at the same time, or within a predefined amount of time of one another, via network(s) 404.

Figure 5A:
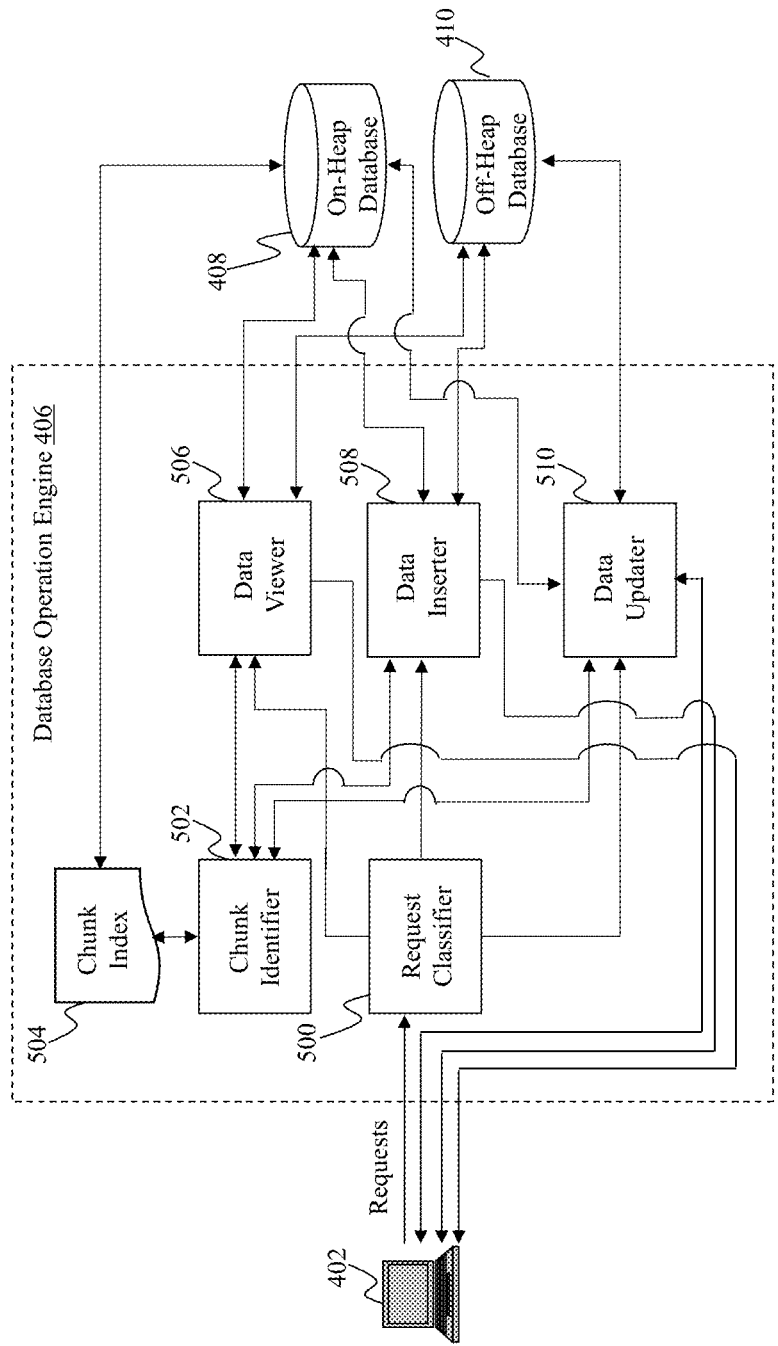
FIG. 5A is an illustrative diagram of an exemplary database operation engine, in accordance with various embodiments of the present teaching.

FIG. 5A is an illustrative diagram of an exemplary database operation engine, in accordance with various embodiments of the present teaching. Database operation engine 406, in the illustrative embodiment, may include a request classifier 500, a chunk identifier 502, a data viewer 506, a data inserter 508, and a data updater 510. Each of request classifier 500, chunk identifier 502, data viewer 506, data inserter 508, and data updater 510 one or more processors, memory, and communications platform capable of connecting to network(s) 404 and/or databases 408 and 410.

The processor(s) may include any suitable processing circuitry capable of controlling operations and functionality of one or more components/modules of data operation engine 406. The processor(s) may also facilitate communications between various components within data operation engine 406, as well as, or alternatively, with one or more other systems/components of environments 400 and 450. In some embodiments, each processor may include a central processing unit ("CPU"), a graphic processing unit ("GPU"), one or more microprocessors, a digital signal processor, or any other type of processor, or any combination thereof. In some embodiments, the functionality of the processor may be performed by one or more hardware logic components including, but not limited to, field-programmable gate arrays ("FPGA"), application specific integrated circuits ("ASICs"), application-specific standard products ("ASSPs"), system-on-chip systems ("SOCs"), and/or complex programmable logic devices ("CPLDs"). Furthermore, each processor may include its own local memory, which may store program systems, program data, and/or one or more operating systems. However, the processors may run an operating system ("OS") for one or more components of data operation engine 406, and/or one or more firmware applications, media applications, and/or applications resident thereon.

The memory may include one or more types of storage mediums such as any volatile or non-volatile memory, or any removable or non-removable memory implemented in any suitable manner to store data for data operation engine 406. For example, information may be stored using computer-readable instructions, data structures, and/or program systems. Various types of storage/memory may include, but are not limited to, hard drives, solid state drives, flash memory, permanent memory (e.g., ROM), electronically erasable programmable read-only memory ("EEPROM"), CD-ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, the memory may be implemented as computer-readable storage media ("CRSM"), which may be any available physical media accessible by the processors to execute one or more instructions stored within the memory. In some embodiments, one or more applications may be stored within the memory. The processors may be configured to execute one or more instructions associated with those applications, where the one or more instructions are operable to be stored within the memory (either persistently or temporarily).

The communications platform may include any communications platform and/or circuitry allowing or enabling one or more components of data operation engine 406 to communicate with one another, and/or with one or more additional devices, servers, databases (e.g., on-heap database 408, off-heap database 410), and/or systems. In some embodiments, communications between one or more components of data operation engine 406 may be communicated using 402 across network(s) 404 via the communications platform. For example, network(s) 404 may be accessed using Transfer Control Protocol and Internet Protocol ("TCP/IP") (e.g., any of the protocols used in each of the TCP/IP layers), Hypertext Transfer Protocol ("HTTP"), WebRTC, SIP, and/or wireless application protocol ("WAP"). Various additional communication protocols may be used to facilitate communications between various components of data operation engine and/or to/from data operation engine 406, including, but not limited to, Wi-Fi (e.g., 802.11 protocol), Bluetooth, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS 136/TDMA, iDen, LTE or any other suitable cellular network protocol), infrared, BitTorrent, FTP, RTP, RTSP, SSH, and/or VOIP. The communications platform may use any communications protocol, such as any of the previously mentioned exemplary communications protocols. In some embodiments, one or more components of data operation engine 406 may include one or more antennas to facilitate wireless communications with a network using various wireless technologies (e.g., Wi-Fi, Bluetooth, radiofrequency, etc.). In yet another embodiment, one or more components of data operation engine 406 may include one or more universal serial bus ("USB") ports, one or more Ethernet or broadband ports, and/or any other type of hardwire access port so that the communications platform facilitates communications with one or more communications networks (e.g., network(s) 404).

Request classifier 500, in one embodiment, may be configured to receive a plurality of requests concurrently (although not required) from one or more user devices 402. In one embodiment, the plurality of requests may be submitted to one or more user devices 402 by one or more users at a same time or within a predetermined short period of time. Request classifier 500 may be configured to classify each of the plurality of requests that are received into one of various types of requests. For instance, request classifier 500 may be further configured to classify each request into one of a data viewing request, a data insertion request, and a data updating request. The data viewing request, as mentioned above and described in greater detail below, may correspond to such operations as gets and scans. A get operation may return a key and/or value associated with the key. A scan request may be to retrieve all values of a range of keys. The scan request may be an ascending scan or a descending scan. An ascending scan may scan a key range from a lower key to a higher key (e.g., scan from key 1 to key 9), whereas a descending scan may scan a key range from a higher key to a lower key (e.g., scan from key 9 to key 1). In one embodiment, the scan request may specify a first key and a second key, defining the key range and thus also indicating the upper and lower bounds of the scan, as well as whether the scan is ascending or descending. The scan operation may retrieve all values of the keys between the first key and the second key (which may also include the first and second keys). The data insertion request, as mentioned above and described in greater detail below, may correspond to operations that insert (e.g., write) keys, values, and/or key-value pairs to databases 408 and/or 410. In some embodiments, data insertion request may be to add the data including a key and an associated value in one of databases 408 and 410 if the key is absent in from the databases. The data update request, as mentioned above and described in greater detail below, may correspond to an operation that performs an update to a value associated with a key. For instance, a data update request may cause a value associated with a key to be marked as deleted. In some embodiments, the data update request may further include a function indicating how a corresponding value is to be updated. Request classifier 500 may be further configured to provide a response to user device 402, which may include one or more keys, one or more values, one or more key-value pairs, confirmation that an operation performed successfully (e.g., return "True"), and/or an indication that an operation failed or was unable to be performed (e.g., return "False").

Data viewer 506, in one embodiment, may be configured to receive one or more data viewing requests from request classifier 500. In some embodiments, the data viewing requests may be received concurrently with one another and/or concurrently with one or more other types of requests. Upon receiving the data viewing request(s), data viewer 506 may access chunk identifier 502 to identify a memory chunk (e.g., memory chunks 204a-d) storing a corresponding key associated with the data viewing request.

Chunk identifier 502 may, for instance, upon receiving the corresponding request, access chunk index 504 to identify a memory chunk that is associated with the key included within the request. Chunk index 504, in one embodiment, may be substantially similar to chunk index 202 of FIG. 2 and/or chunk index 302 of FIGS. 3A and 3B. Upon identifying the memory chunk (e.g., memory chunk 204b) that is associated with the key included within the data viewing request, for example, chunk identifier 502 may provide information indicating the identified memory chunk to data viewer 506. Similarly, for other requests (e.g., data insertion requests and data update requests), chunk identifier 502 may identify the memory chunk using chunk index 504 and then provide the identified memory chunk's information to the requesting component (e.g., data inserter 508, data updater 510).

Data viewer 506, in response to receiving information indicating the memory chunks location associated with the key or keys included within the data viewing request, may access on-heap database 408 and/or off-heap database 410. For instance, for keys stored within on-heap database 408 (e.g., data store 300), data viewer 506 may query on-heap database 408 to obtain the keys and/or identify, using the value handles, a location of the values associated with those keys. If the values are stored within on-heap database 408, then data viewer 506 may obtain the keys and their corresponding values, and may return them to user device 402. If the keys and/or values are stored within off-heap database 410, data viewer 506 may access off-heap database 410 to obtain the keys and/or values. In some embodiments, as mentioned above and described in greater detail below, data viewer 506 may access an entry within an entry array (e.g., entry array 206) associated with a corresponding key. The entry associated with the key may include a pointer indicating a location of the key within a first memory site (e.g., on-heap database 408) or a second memory site (e.g., off-heap database 410). Using the pointers, the key(s) and the value(s) may be identified and returned, depending on the request type (e.g., get, ascending scan, descending scan).

Data inserter 508, in some embodiments, may be configured to perform one or more data insertion operations in response to receiving one or more requests from request classifier 500 (e.g., data insertion requests). The data insertion operation may depend on the particular request that is received. For example, the insertion operation may include one of a put operation, a put-if-absent operation, and/or a put-if-absent-compute-if-present operation. As described above and expanded upon below, each data insertion operation may access on-heap database 408 and/or off-heap database 410 to perform a corresponding operation. Furthermore, data inserter 508 may first retrieve information indicating a memory chunk associated with the key of the request from chunk identifier 502. The various put operations may each be configured to put a key, a value, and/or a key-value pair into a corresponding database or databases. Furthermore, in some embodiments, the put-if-absent-compute-if-present operation may enable a value to be stored within on-heap or off-heap memory if that value (and/or the key for that value) are absent from database 408 and/or 410; or alternatively, compute a new value for the value if that value is present within one of databases 408 and 410. Upon completion of the data insertion operation(s), a confirmation (e.g., return "True") or an indication of failure (e.g., return "False" or "Null") may be provided to user device 402.

Data updater 510 may be configured, in some embodiments, to perform one or more data update operations in response to receiving one or more data updating requests from request classifier 500. As described above and expanded upon below, each data update operation may access on-heap database 408 and/or off-heap database 410 to perform a corresponding operation. After receiving the data updating requests, data updater 510 may obtain information indicating a memory chunk associated with the key, or keys, indicated to be updated by the request(s) from chunk identifier 502. Using the chunk information, data updater 510 may access one or more of databases 408 and 410 to perform the corresponding data update operation. The various types of data update operations may include, but are not limited to, computer-if-present operations, remove operations, and do-if-present operations. In some embodiments, the compute-if-present operation and the do-if-present operations, which may be related to one another (e.g., do-if-present may perform the computation upon the compute-if-present operation determining that the corresponding key is present) may also be associated with a function defining the operation to be performed to a value. For example, the function may indicate how a particular value is to be updated. Upon completion of the data update operation, a confirmation (e.g., return "True") or ab indication of failure (e.g., return "False" or "Null") may be provided to user device 402 from data updater 510.

Figure 5B:
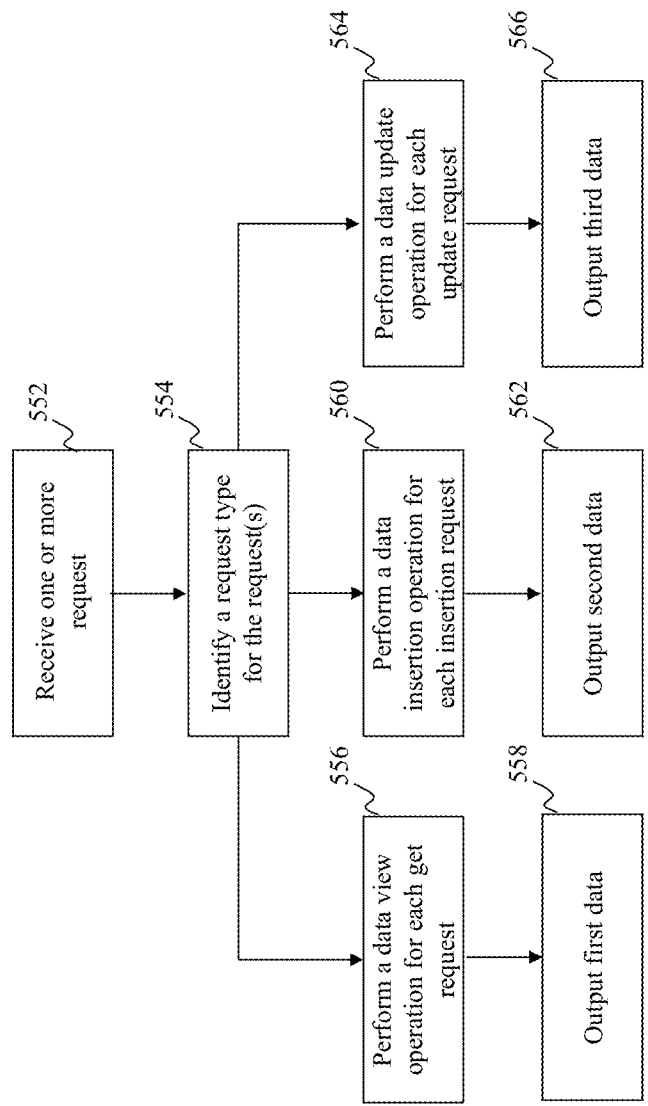
FIG. 5B is an illustrative flowchart of an exemplary process for outputting data based on a request type received, in accordance with various embodiments of the present teaching.

FIG. 5B is an illustrative flowchart of an exemplary process for outputting data based on a request type received, in accordance with various embodiments of the present teaching. In the non-limiting embodiment, process 550 may begin at step 552. At step 552, one or more requests may be received. For example, request classifier 500 may receive one or more requests concurrently or within a substantially short time of one another. At step 554, a request type for each of the one or more requests may be identified. For instance, request classifier 500 may determine whether each request corresponds to a data viewing request, a data insertion request, or a data update request.

If the type of request is determined to be a data viewing request, process 550 may proceed to step 556. At step 556, a data view operation may be performed for each view request. For instance, data viewer 506 may perform each data viewing operation. At step 558, first data may be output. For instance, in response to the view request(s), data viewer 506 may output first data including one or more keys and/or values. The first data may, for example, be output to user device 402.

If the type of request is determined to be a data insertion request, then process 550 may proceed to step 560. At step 560, a data insertion operation may be performed for each insertion request. For instance, data inserter 508 may perform each data insertion operation. At step 562, second data may be output. For instance, in response to the insertion request(s), data inserter 508 may output second data confirming the insertion operation was successful, or indicating that the insertion operation was unsuccessful. The second data may, for example, be output to user device 402.

If the type of request is determined to be a data update request, process 550 may proceed to step 564. At step 564, a data update operation may be performed for each update request. For instance, data updater 510 may perform each data update operation. At step 566, second data may be output. For instance, in response to the update request(s), data updater 510 may output third data indicating a new value computed, a confirmation that that the update operation was successful, and/or a notification indicating that the update operation was unsuccessful. The third data may, for example, be output to user device 402.

Figure 6A:
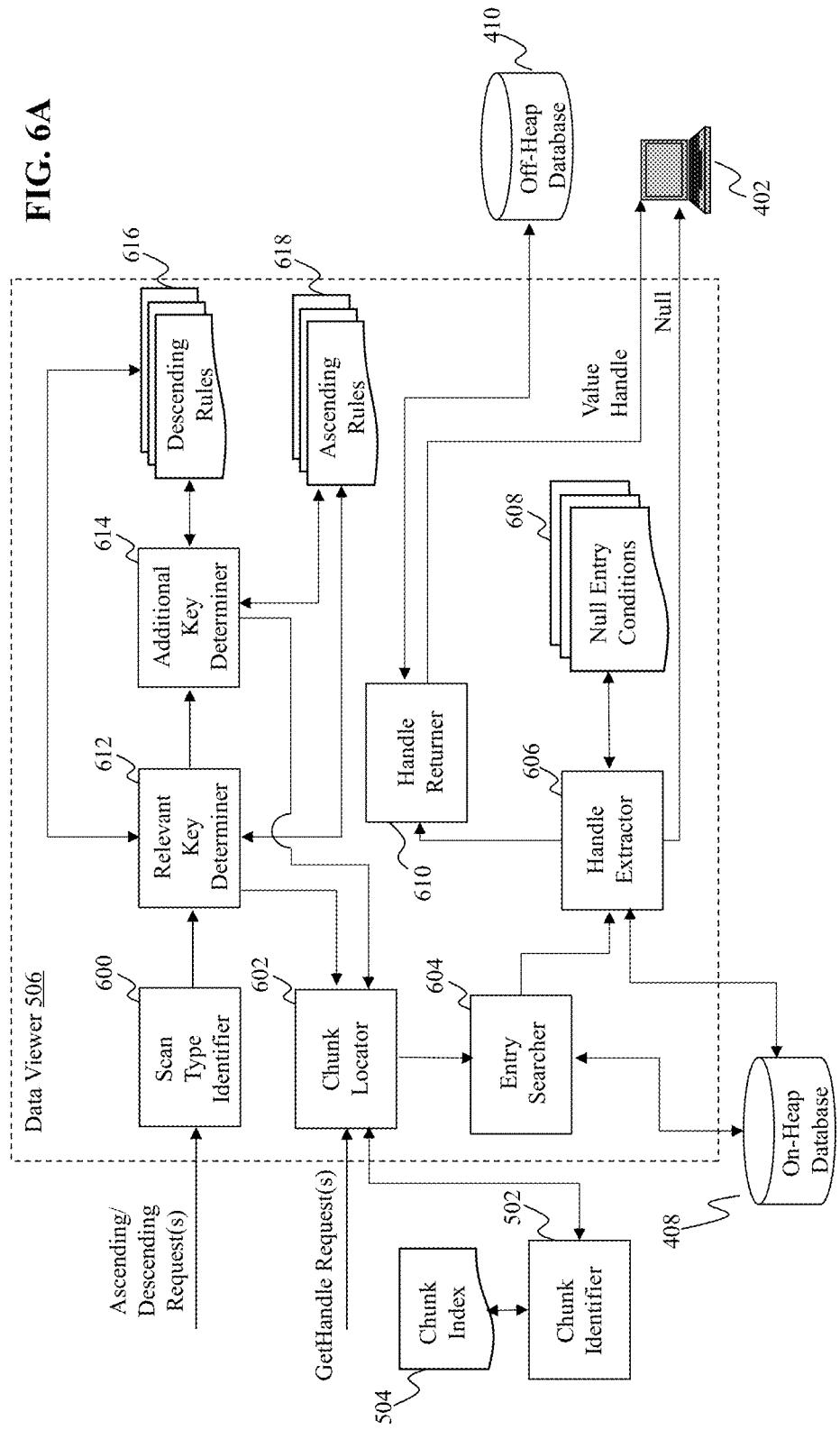
FIG. 6A is an illustrative diagram of an exemplary data viewer, in accordance with various embodiments of the present teaching.

FIG. 6A is an illustrative diagram of an exemplary data viewer, in accordance with various embodiments of the present teaching. Data viewer 506, in the illustrative embodiment, may include a scan type identifier 600, a chunk locator 602, an entry searcher 604, a handle extractor 606, a handle returner 610, a relevant key determiner 612, and an additional key determiner 614. In some embodiments, each of scan type identifier 600, chunk locator 602, entry searcher 604, handle extractor 606, handle returner 610, relevant key determiner 612, and additional key determiner 614 may include one or more processors, memory, and a communication platform to facilitate the functionality associated with that component. For instance, the memory of each of scan type identifier 600, chunk locator 602, entry searcher 604, handle extractor 606, handle returner 610, relevant key determiner 612, and additional key determiner 614 may include one or more computer programs that, when executed by the one or more processors, cause the corresponding component to perform a particular function or functions.

In some embodiments, chunk locator 602 may receive a data view request from request classifier 500. In particular, chunk locator 602 may receive, in one embodiment, a getHandle request. The getHandle request may return a read-only view of a handle of a value mapped to a given key. For instance, the getHandle request may include a key with which a value associated with that key is to be viewed. As an illustrative example, the getHandle request may be received in a format of: getHandle(key). After receiving the getHandle request, chunk locator 602 may locate a memory chunk (e.g., memory chunks 204a-d) for that key. In some embodiments, the memory chunk may be located within chunk index 504 via a chunks linked list traversal. Chunk locator 602 may then provide information indicating the memory chunk associated with the key included within the getHandle request to entry search 604.

Entry searcher 604 may be configured to search an entry array (e.g., entry array 206) of a particular memory chunk to find an entry associated with the key. Entry searcher 604 may, in one embodiment, access on-heap database 408 to find the entry associated with the key. As mentioned above, the entry array (e.g., entry array 206) of a memory chunk may be stored within a first memory site, such as within on-heap memory. Thus, on-heap database 408 may be accessed. If an entry is found within the entry array for the given key, the entry the data stored thereby may be provided to handle extractor 606.

Handle extractor 606 may be configured, upon receipt of the entry, or information associated with the entry's location within the entry array, determine whether a valid handle is found in associated with that entry. Handle extractor 606, in one embodiment, may access on-heap database 408 to determine whether a value handle for that entry exists within handle array 210, for example. If a handle for that entry does in fact exist, then handle extractor 606 notifies handle returner 610. Handle returner 610 may be configured, in one embodiment, to generate a new read-only buffer that points to the handle and then returns the value handle to user device 402 (e.g., the requesting user device). In one embodiment, handle returner 610 may access off-heap database 410 to access the value. However, if an entry is not found within the entry array for the memory chunk, entry searcher 604 may notify handle extractor 606. Handle extractor 606, in this particular scenario, may access null entry conditions 608 to determine a next procedure or an action to occur, if any. For instance, in one embodiment, null entry conditions 608 may indicate that handle extractor 606 is to return a null message to user device 402. Furthermore, if entry searcher 604 found an entry for the key, and handle extractor 606 determines that the handle for that entry (as indicated by the pointer to the value handle stored by the entry) is marked with a deletion marker, then handle extractor 606 may access null entry conditions 608. In this particular scenario (e.g., handle index marked with deletion marker), null entry conditions 608 may provide instructions to handle extractor 606 to return a null message to user device 402.

Figure 6B:
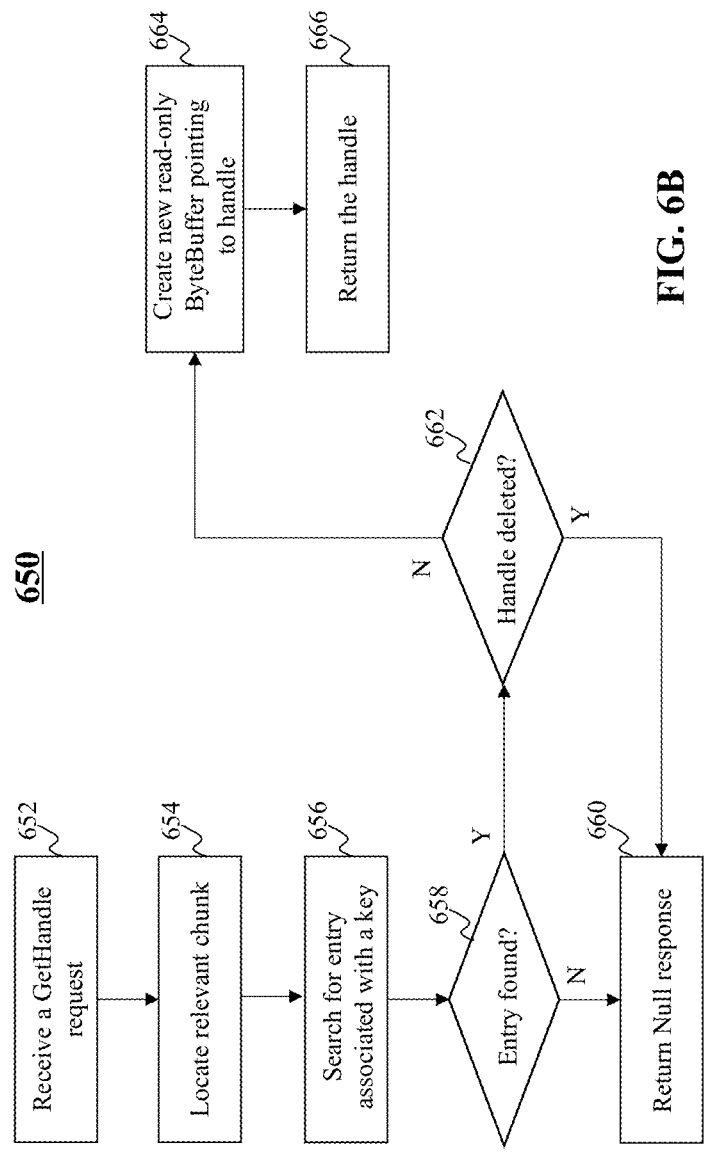
FIG. 6B is an illustrative flowchart of an exemplary process for returning a handle in response to a request, in accordance with various embodiments of the present teaching.

FIG. 6B is an illustrative flowchart of an exemplary process for returning a handle in response to a request, in accordance with various embodiments of the present teaching. Process 650, in the non-limiting embodiment, may begin at step 652. At step 652, a getHandle request may be received. At step 654, a relevant chunk may be located. At step 656, a search for an entry associated with a key identified within the getHandle request (e.g., getHandle (key)) may be performed. At step 658, a determination may be made as to whether an entry within the relevant chunk's entry array is found. If not, then process 650 may proceed to step 660, where a null response message may be returned to user device 402. However, if the entry within the relevant chunk's entry array is found, process 650 may proceed to step 662. At step 662, a determination may be made as to whether the handle associated with the relevant key is marked as deleted. If so, then process 650 may proceed to step 660. However, if the handle is not marked as deleted, then process 650 may proceed to step 664. At step 664, a new read-only ByteBuffer may be created that points to the handle for the given key. At step 666, the handle may be returned.

Returning to FIG. 6A, in some embodiments, request classifier 500 may determine that the request received corresponds to a data view operation, but instead of a getHandle request, the request corresponds to an ascending scan request or a descending scan request. In this particular scenario, the ascending/descending scan request(s) may be provided to scan type identifier 600. Scan type identifier 600 may be configured to determine whether the received scan request(s) correspond to an ascending scan or a descending scan. Upon determining whether scan request is for ascending scans or descending scan, scan type identifier 600 may provide information regarding the scan request(s), such as, and without limitation, an indication of the scan being an ascending scan or a descending scan, a minimum key for the scan, and a maximum key for the scan, top relevant key determiner 612.

For an ascending scan request, relevant key determiner 512 may access ascending rules 618 to determine a process by which to perform the ascending scan request. The ascending scan rules 618, in one embodiment, may indicate that a relevant chunk or chunks are to be determined first. Relevant key determiner 512 may be configured access chunk locator 602 to determine first memory chunk with a relevant key in the scan range of keys. Chunk locator 602, for instance, may scan chunk index 504 to determine which chunks are relevant to the scan based on the minimum and maximum keys included within the request. Next, entry searcher 604 may be configured to traverse the entry array (e.g., entry array 206) for each of the identified relevant chunks. After a first chunk's array is traversed, if necessary, a next relevant chunk may be accessed, and its entry array traversed. For every entry within the entry array that is encountered, handle extractor 606 determines whether the handle is not marked with the deletion marker. If the handle for that key is not marked with the deletion marker, handle returner 610 may be configured to return a corresponding key associated with the encountered entry/entries, and a read-only ByteBuffer for the handle's value. If the handle, however, is determined to be marked with the deletion marker, then additional key determiner 614 may determine whether the scanned range of keys has reached an end. If not, then additional key determiner 614 may be configured to cause entry searcher 604 (and/or chunk locator 602) to begin the process of determining a next entry within the entry array following a similar procedure as described above. If there are no more additional keys determined to be scanned, then additional key determiner 614 may cause the process to cease and the obtained keys and read-only ByteBuffers of the handles. The end result, in one embodiment, may be a range of keys and their corresponding values returned to user device 402, where the returned value, in this particular scenario, may correspond to the read-only ByteBuffer for the handle.

Figure 7A:
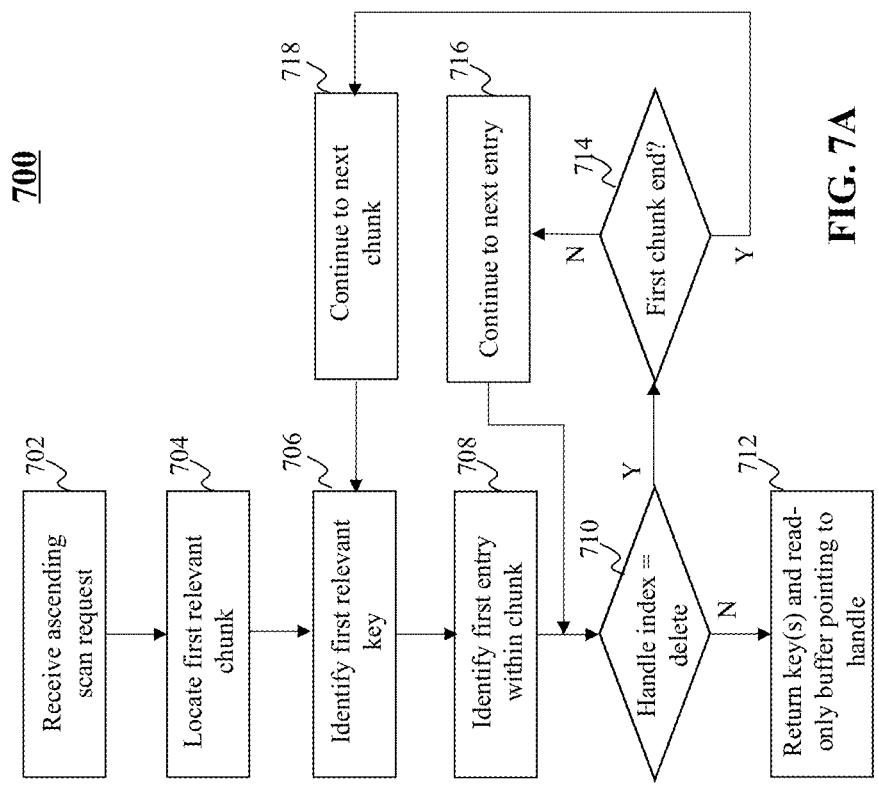
FIGS. 7A and 7B are illustrative flowcharts of exemplary processes for performing ascending and descending scans, respectively, in accordance with various embodiments of the present teaching.

FIG. 7A is an illustrative flowchart of exemplary process for performing an ascending scan, in accordance with various embodiments of the present teaching. Process 700 may, in a non-limiting embodiment, begin at step 702. At step 702, an ascending scan request may be received. At step 704, a first relevant memory chunk may be located. At step 706, a first relevant key within the first relevant memory chunk may be identified. At step 708, a first entry within the memory chunk's entry array may be identified. At step 710, a determination may be made as to whether the handle index for the first entry is marked with the deletion marker. If so, process 700 may proceed to step 714. If not, process 700 may proceed to step 712. At step 712, one or more keys and a read-only buffer pointing to those one or more keys' corresponding handle may be returned. At step 714, a determination may be made as to whether an end of a chunk's entry array has been reached. If not, process 714 may proceed to step 716. At step 716, the next entry within the entry array may be continued to and process 700 may proceed to step 710. However, if at step 714 it is determined that the end of the first chunk has been reached, then process 700 may proceed to step 718. At step 718, a next chunk may be identified and process 700 may proceed to step 706. If there is no next chunk, however, although not shown within process 700, then process 700 may end.

For a descending scan, relevant key determiner 612 may obtain descending rules 616 to determine a process by which to perform the descending scan. The descending scan rules 616, in one embodiment, may indicate that a last relevant chunk is to be determined first. The last relevant chunk, in one embodiment, may correspond to the chunk that corresponds to a last relevant key of the scanned range of keys. After chunk locator 602 identifies the last relevant chunk, entry searcher 604 may traverse the entry array for that chunk until a last relevant entry (based on the range of keys identified) is found. Entry searcher 604 may, in one embodiment, be configured to save a stack of entries traversed thus far since a last relevant entry that belongs to the chunk's ordered prefix. As mentioned above, when a rebalance of a chunk occurs, the chunk a prefix of entries is initially sorted such that a successor of each entry is the ensuring entry in that array. Entries may be added to the entry array and the new entries are inserted at a first free cell and is connected via a bypass in the linked list. After a stack is exhausted and a prefix entry is encountered, the scan operation moves to a next prefix entry and rebuilds the stack with the entries of the linked list in the next bypass. An illustrative diagram of the process performed by the descending scan operation is described with reference to FIGS. 7C and 7D.

Figure 7B:
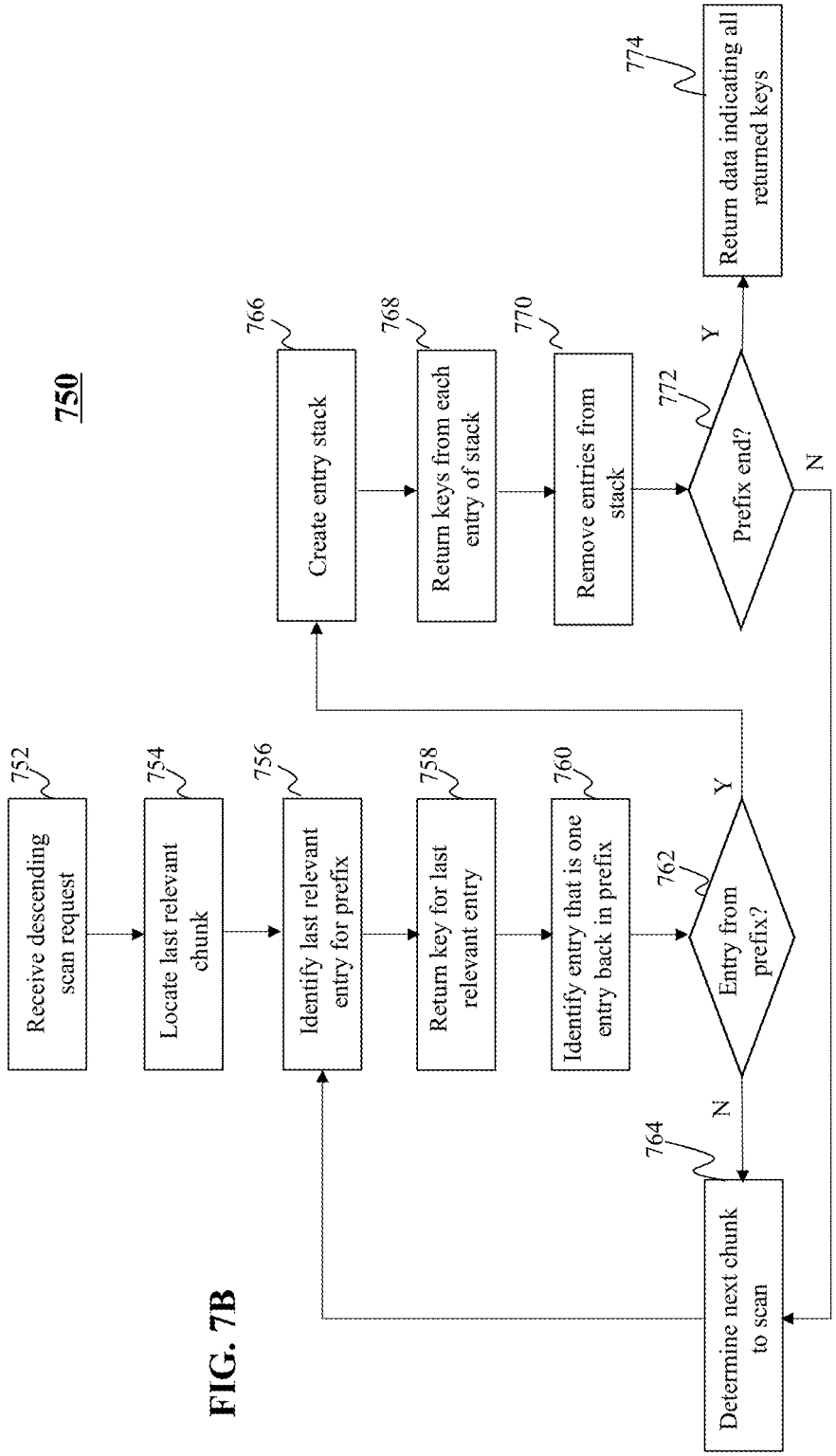

FIG. 7B is an illustrative flowchart of exemplary process for performing a descending scan, in accordance with various embodiments of the present teaching. Process 750 may, in a non-limiting embodiment, begin at step 752. At step 752, a descending scan request may be received. At step 754, a last relevant memory chunk may be located. At step 756, a last relevant entry for an ordered prefix may be identified. At step 758, a key for the last relevant entry may be returned. At step 760, an entry that is one entry back in the ordered prefix may be identified. At step 762, a determination may be made as to whether the entry that is one entry back is from the prefix. If not, process 750 may proceed to step 764. At step 764, a next chunk to scan may be determined and process 750 may return to step 756.

If, however, at step 762, it is determined that the entry one back of a previously identified entry (e.g., from step 760) is within the prefix, then process 766 may proceed to step 766. At step 766, an entry stack may be created. At step 768, keys from each entry stack may be returned. At step 770, entries from the stack may be removed. At step 772, a determination may be made as to whether an end of the prefix has been reached. If not, then process 750 may proceed to step 764. However, if the end of the prefix has been reached, then process 750 may proceed to step 774. At step 774, data indicating all returned keys, as well as, in some embodiments, the read-only buffers for the handles for those keys, may be returned.

Figures 7C, 7D:
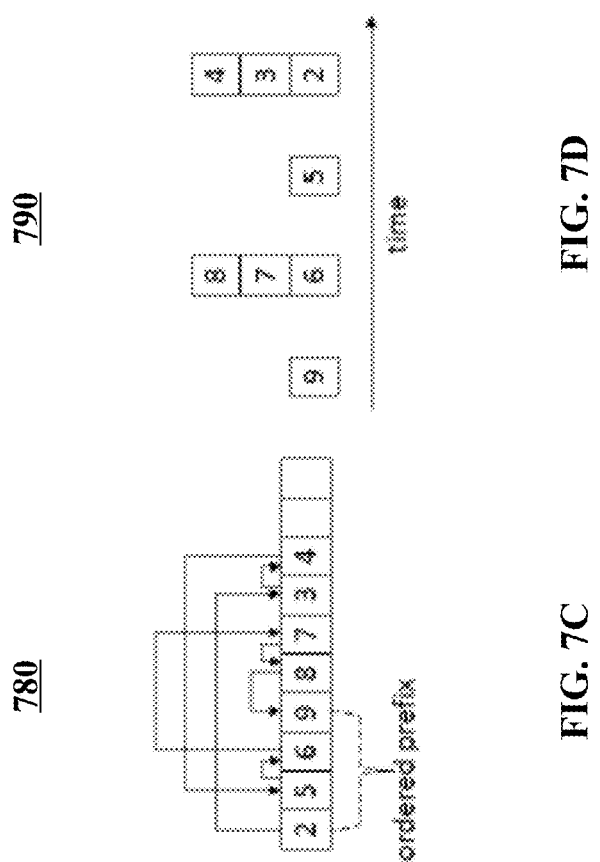
FIGS. 7C and 7D are illustrative diagrams of entry stacks built for a descending scan operation, in accordance with various embodiments of the present teaching.

FIGS. 7C and 7D are illustrative diagrams of entry stacks built for a descending scan operation, in accordance with various embodiments of the present teaching. FIG. 7C includes an entries linked list 780. As seen within FIG. 7C, entries linked list 780 includes an ordered prefix including: 2, 5, 6, and 9. Thus, the last relevant entry in the prefix, in this example, is the entry 9. FIG. 7D includes stacks 790 of entries that are constructed during the descending scan operation. To traverse all the entries in descending order, the last relevant entry in linked list 780 is determined. For instance, relevant key determiner 612 and/or entry searcher 604 may determine the last relevant entry. In this particular example, the last relevant entry may be the entry with key 9. Next, relevant key determiner 612 and/or entry searcher 604 may be configured to determine whether this entry (e.g., the last relevant entry) is within the ordered prefix, thus indicating that there is no next entry within the linked list. If so, this entry is returned, as seen within stack 790. However, if there is a next entry, then this means that the identified entry is not the last relevant entry.

After returning the last relevant entry, additional key determiner 614 and/or entry searcher 604 may determine a next entry one back in the prefix. Looking at the example of FIG. 7C, the next entry is the entry corresponding to the key 6. Entry searcher 604 may then traverse the linked list in descending order until a previously seen entry (e.g., entry for key 9) is found. A stack of entries may then be returned, as seen within stack 790, with the stack of entries for keys 8, 7, and 6. Each stack entry may then be popped and returned, as those of ordinary skill in the art will understand. After the stack is empty, relevant key determiner 612 and/or entry searcher 602 may move one entry back in the prefix and traverse linked list 780 again. After entry for key 5, in the illustrated example, is the entry for key 6, which is also a prefix, and thus the entry for key 5 can be returned. The process may then repeat, moving one back to the entry for key 2, which causes a stack of the entries for keys 4, 3, and 2 to be created. These entries may be popped and returned as well. After a chunk's linked list is traversed, additional key determiner 614 may access chunk locator 602 to determine whether another chunk exists having a greatest minimal key that is less than the current chunk's minimal key. The linked list for the newly found chunk may then proceed in a similar manner as described above until a last chunk having a minimal key that is less than a current chunk's minimal key is identified and traversed.

Figure 8A:
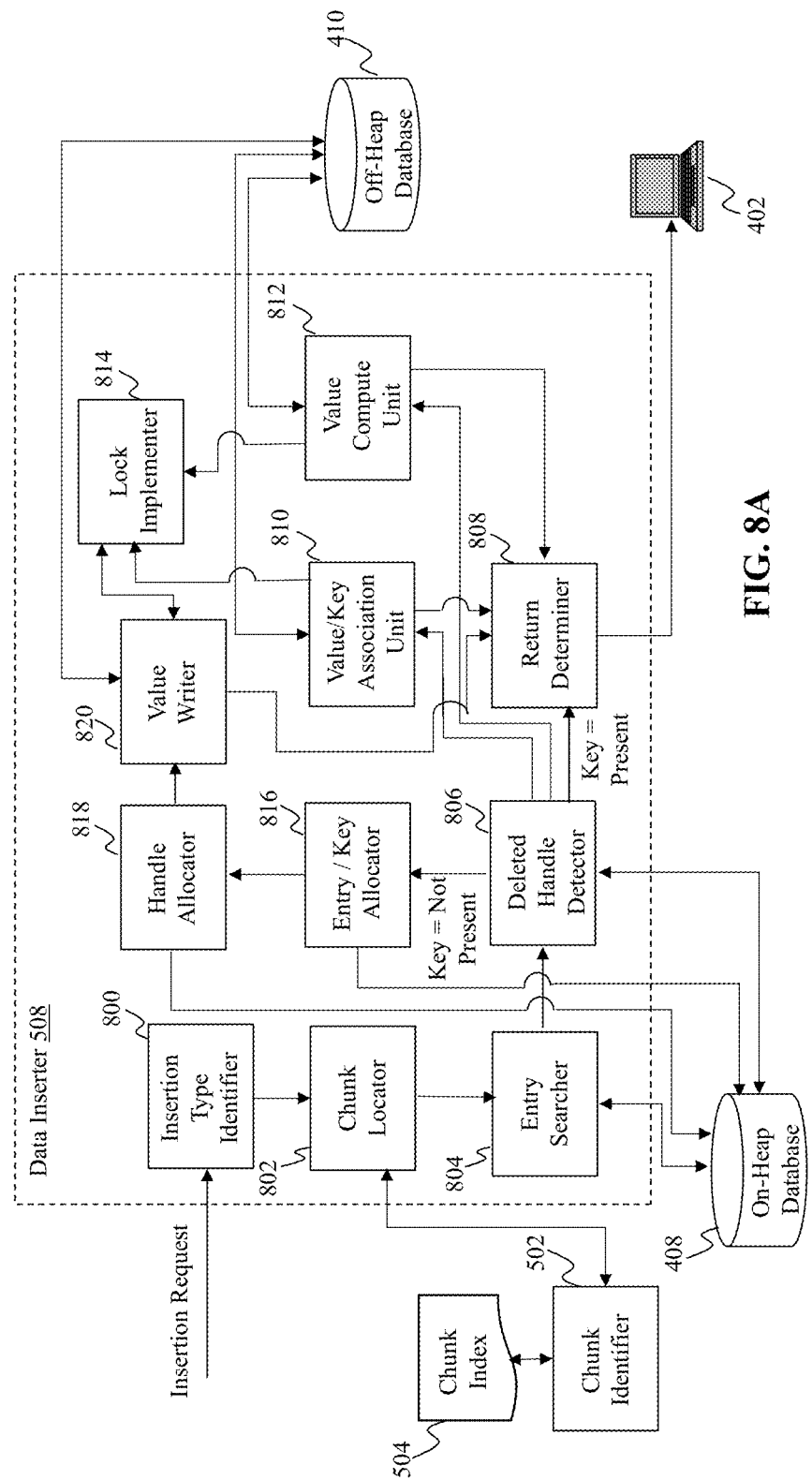
FIG. 8A is an illustrative diagram of an exemplary data inserter, in accordance with various embodiments of the present teaching.

FIG. 8A is an illustrative diagram of an exemplary data inserter, in accordance with various embodiments of the present teaching. Data inserter 508, in the illustrative embodiment, may include an insertion type identifier 800, a chunk locator 802, an entry searcher 804, a deleted handle detector 806, a return determiner 808, a value/key association unit 810, a value compute unit 812, a lock implementer 814, an entry/key allocator 816, a handle allocator 818, and a value writer 820. In some embodiments, each of insertion type identifier 800, chunk locator 802, entry searcher 804, deleted handle detector 806, return determiner 808, value/key association unit 810, value compute unit 812, lock implementer 814, entry/key allocator 816, handle allocator 818, and value writer 820 may include one or more processors, memory, and a communication platform to facilitate the functionality associated with that component. For instance, the memory of each of insertion type identifier 800, chunk locator 802, entry searcher 804, deleted handle detector 806, return determiner 808, value/key association unit 810, value compute unit 812, lock implementer 814, entry/ key allocator 816, handle allocator 818, and value writer 820 may include one or more computer programs that, when executed by the one or more processors, cause the corresponding component to perform a particular function or functions.

Insertion type identifier 800 may, in some embodiments, be configured to receive an insertion request from request classifier 500. Insertion type identifier 800 may determine, upon receipt of the request, a type of data insertion operation to be performed based on the request. The various data insertion operations may include, but are not limited to, a put operation, a put-if absent operation, and a put-if-absent-compute-if-present operation. Each of these requests may be operable to associate a specific key, identified within the request (e.g., put(key, value)), with a given value. In this scenario, a put-if-absent operation would insert a value for a specified key. If the value is already associated with a key, then a new value is computed (e.g., via the put-if-absent-compute-if-present operation) and associated with the key. In this particular scenario, a function defining how the computation of the new key may be included with the data insertion operation request. For example, the request may be putIfAbsentComputeIfPresent(key, value, function). After identifying the data insertion operation indicated by the request, insertion type identifier 800 may provide information indicating the specific type of data insertion operation specified by the request to chunk locator 802.

Chunk locator 802 of FIG. 8A may, in some embodiments, be substantially similar to chunk locator 602 of FIG. 6A and the previous description may apply. Chunk locator 802 may determine a particular memory chunk having an entry associated with the key specified by the data insertion request. In one embodiment, chunk locator 802 may communication a request to chunk identifier 802, which in turn may query chunk index 504 to determine a memory chunk stored by the first memory site (e.g., on-heap database 408) that includes, or likely includes, an entry for that key. Upon locating the memory chunk, chunk locator 802 may provide the memory chunk's location within on-heap database 408 of the memory chunk to entry searcher 804.

Entry searcher 804, in some embodiments, may be substantially similar to entry searcher 604 of FIG. 6A, and the previous description may apply. Entry searcher 802 may, in some embodiments, search an entry array of the memory chunk, which may be stored within on-heap database 408. In one embodiment, entry searcher 804 may, upon locating the entry for the key within the entry array, determine whether the handle pointed to by one of the entry's pointers is marked deleted or not. Upon finding the entry for the specified key, entry search 804 may provide the entry and/or information about the entry's location within the entry array, to deleted handle detector 806.

Deleted handle detector 806 may be configured to determine whether the handle for the key is marked as deleted or not. This determination may occur by accessing the handle array (e.g., handle array 210) within the memory chunk's data structure, stored within on-heap database 806. If deleted handle detector 806 determines that the handle is not marked deleted, then deleted handle detector 806 may notify value/ key association unit 810 and value compute unit 812. In some embodiments, this may correspond to the key being present within off-heap database 410. However, if deleted handle detector 806 determines that the handle is marked deleted, then deleted handle detector 806 may notify entry/ key allocator 816. In some embodiments, this may correspond to the key being not present within off-heap database 410.

Value/key allocation 818 maybe configured to associate a value with the key. To do so, off-heap database 410 may be accessed. If the a value handle for the key is not marked with a deletion marker, then value compute unit 812 may be accessed to perform a computation of the new value based on a function specified within the data insertion request and the previous value. Once computed, the new value may be stored in association with the key within a ByteBuffer stored within off-heap database 410. In some embodiments, value/ key allocator 810 and value compute unit 812 may communicate with lock implementer 814 to implement a lock on any concurrent operations. For instance, in some embodiments, atomic handle operations may have a read-write lock implemented by lock implementer 814. Lock implementer 814 may cause value/key association unit 810 and/or value compute unit 812 to return false (e.g., return a false message to user device 402) to return determiner 808. Return determiner 808 may then be configured to output data indicating the false that was returned. In some embodiments, the return determiner 808 may return false if deleted handle detector 806 determined that the handle for a specified key was marked deleted. This, in some embodiments, may be due to a concurrent remove operation being performed. In some embodiments, the process may be repeated to attempt to perform the put operation, as described above, in this particular scenario.

If deleted handle detector 806, however, determines that no handle is present for a given key, (i.e., the handle is marked as deleted), then deleted handle detector 806 may notify entry/key allocator 816. Entry/key allocator 716, in one embodiment, may be configured to determine whether an entry already exists within the current memory chunk's entry array that points to a same key as the key identified from the request, but whose handle has the deletion marker indicating a deleted handle. If such an entry is found, the entry may be reused. In some embodiments, the searching of the entry array for a same key, as mentioned previously, may be performed by entry searcher 804. If, however, entry/key allocator 716 determines that there is no entry within the current memory chunk's entry array pointing to the identified key, then entry/key allocator 816 may be configured to allocate a new entry in the entry array stored within on-heap database 408. Additionally, entry/key allocator 816 may be configured to allocate and write the key that will be pointed to by a pointer associated with the new entry. In some embodiments, entry/key allocator 816 may further be configured to link the new entry to the existing entries within the entry array.

Handle allocator 818, in response to entry/key allocator 816 allocating the new entry and allocating and writing the key, may be configured to allocate a handle that the new entry will point to. After the entry and key have been allocated by entry/key allocator 816, and the handle has been allocated by handle allocator 818, value writer 820 may be notified. Value writer 820, in one embodiment, may be configured to write the value within off-heap database 410. For example, the new value may be written to portion 224 of off-heap ByteBuffer 220. Furthermore, value writer 820 may be configured to instruct another pointer associated with the entry for the newly written value's key to now point to the handle for that key. Additionally, value writer 820 may be configured to have the handle for that value point to the value within off-heap database 410. In some embodiment, a compare-and-swap ("CAS") operation may be performed to complete the entry writing process so that the entry points to the allocated handle. The CAS operation may further cause the request to now be removed from the list of pending operations.

If the CAS operation fails, then the process may be repeated to ensure that the data insertion operation associated with the insertion request is processed. For instance, a concurrent non-insertion operation (e.g., a data update operation) may be occurring by database operation engine 406, which may cause the CAS operation to fail. For instance, if the handle is determined to be marked deleted in response to a different operation occurring that deletes the handle or changes a value associated with the handle, then this may be a result of a concurrent operation, thus causing a failed CAS operation result. Therefore, in order to ensure that the insertion request is processed by data inserter 508, the process of performing the data insertion operation may repeat in response to a failed CAS operation being detected by data inserter 508.

Figure 8B:
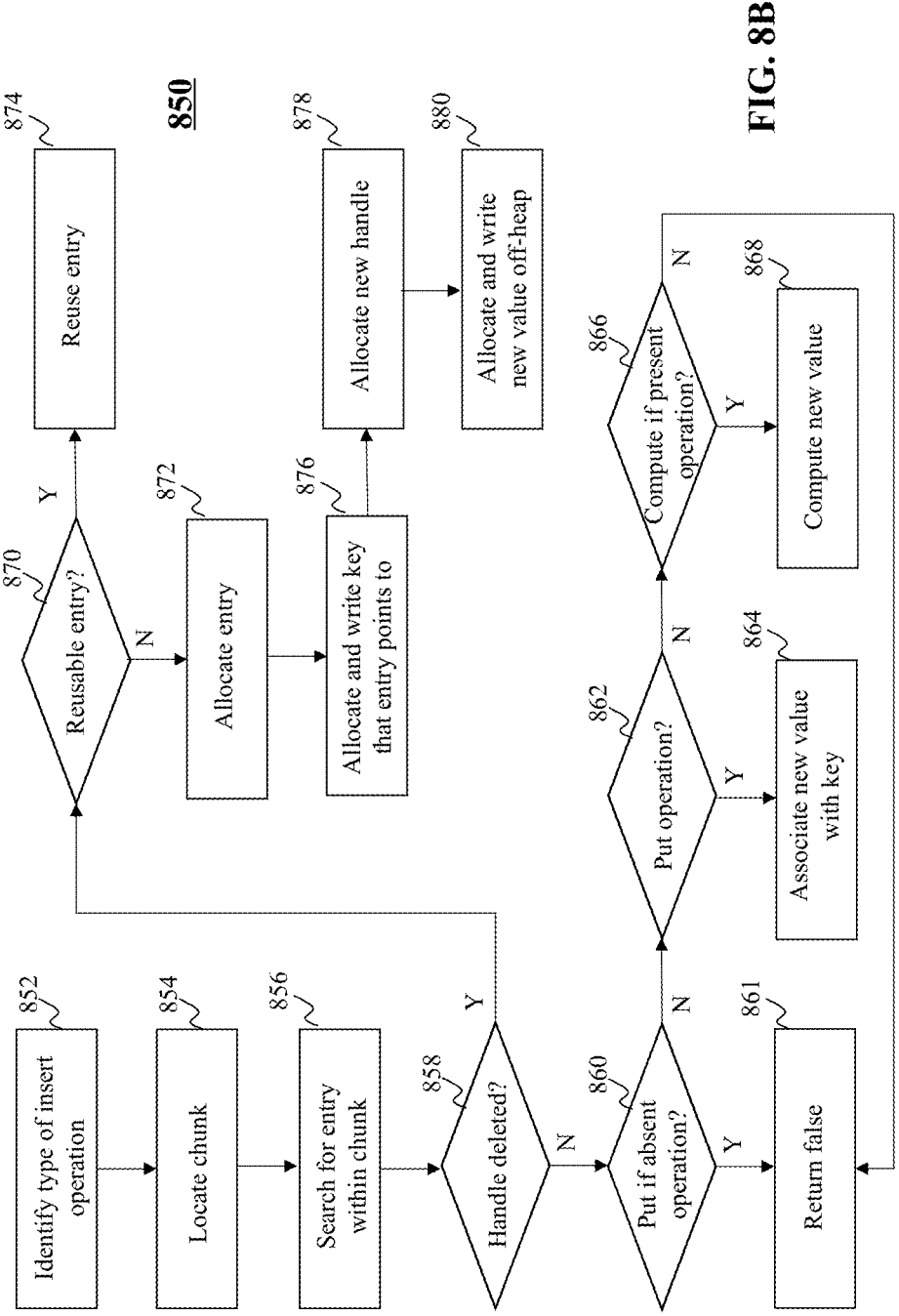
FIG. 8B is an illustrative flowchart of an exemplary process for performing a data insertion operation, in accordance with various embodiments of the present teaching.

FIG. 8B is an illustrative flowchart of an exemplary process for performing a data insertion operation, in accordance with various embodiments of the present teaching. Process 850, in a non-limiting embodiment, may begin at step 852. At step 852, a type of data insertion operation may be identified. For example, insertion type identifier 800 may identify a type of data insertion operation received by data inserter 508 from request classifier 500. At step 854, a memory chunk may be located. For example, chunk locator 802 may locate a memory chunk within on-heap database 408 via chunk identifier 502, which may utilize chunk index 502. At step 856, an entry within the memory chunk may be searched for that corresponds to a key identified from the received data insertion request. For example, if the request is put(key, value), then entry searcher 804 may search through an entry array for an identified memory chunk, which may also be stored within on-heap database 408.

At step 858, a determination may be made as to whether a handle associated with the entry for the given key is marked as deleted. For example, after finding the entry within the entry array, entry searcher 804 may provide the entry to deleted handle detector 806, which may determine whether the handle pointed to by a pointer within the entry is marked as deleted. If, the handle is marked as deleted, process 850 may proceed to step 870. At step 870, a determination may be made as to whether the entry is reusable. If so, then process 870 may proceed to step 874, where the entry may be reused for the new data insertion operation. However, if the entry is not reusable, then process 870 may proceed to step 872. At step 872, a new entry may be allocated for the identified key. For instance, entry/key allocator 816 may allocate a new entry within the entry array of the given memory chunk stored by on-heap database 408.

After allocating the new entry, process 850 may proceed to step 876, where a new key may be allocated and the entry may be provided with a pointer that points to the new key. In some embodiments, if the key is stored within off-heap database 408, then entry/key allocator 816 may write the new key to portion 222 of ByteBuffer 220, for example. However, if the key is stored within on-heap database 408, then entry/key allocator 816 may allocate and write the new key to portion 308 within on-heap database 408. Persons of ordinary skill in the art will recognize that the particular location of the key (e.g., on-heap database 408, off-heap database 410) may depend on the particular configurations of the system, and the aforementioned are merely illustrative. At step 878, a new handle for the entry may be allocated. For example, handle allocator 818 may allocate a new handle for the entry (and key) within on-heap database 408. At step 880, the new value associated with the new handle may be allocated and written to off-heap database 410.

If, however, at step 858, it is determined that the handle pointed to by the identified entry for the given key is not marked deleted, then process 850 may proceed to step 860. At step 860, a determination may be made as to whether the operation associated with the data insertion request is a put-if-absent operation. For example, a put-if-absent operation may be configured to write a key and/or value to memory. If the handle is not marked deleted, then this may correspond to a "present" key scenario, and therefore process 850 may proceed to step 861, where false is returned. For example, value/key association unit 810 may determine, responsive to identifying that the request corresponds to a put-if-absent operation and that the handle is not marked deleted, that the put-if-absent operation fails. Value/key association unit 810 may then provide this information to return determiner 808, which may be configured to return a false message, indicating that the operation failed, to user device 402.

If, at step 860, it is determined that the type of operation associated with the data insertion request is not a put-if-absent operation, then process 850 may proceed to step 862. At step 862, a determination may be made as to whether the operation is a put operation. If so, then process 850 may proceed to step 864. At step 864, a new value may be associated with the key. For example, value/key association unit 810 may associate the new value given by the data insertion operation (e.g., put(key, value)) with the key. This may include indicating where the new value associated with the given key is located within off-heap database 410 (e.g., by generating a pointer for that key's entry to point to the new value's handle within on-heap database 408).

If, however, at step 862, it is determined that the type of operation associated with the data insertion request is not a put operation, then process 850 may proceed to step 866. At step 866, a determination may be made as to whether the operation is a put-if-absent-compute-if-present operation. If not, then process 850 may proceed to step 861, where false is returned to user device 402. However, if the type of operation is determined to be a put-if-absent-compute-if-present operation, then process 850 may proceed to step 868. At step 868, a new value may be computed. For example, value compute unit 812 may determine, based on the current value for the key, which may be stored within off-heap database 410, and a function identified within the data insertion request (e.g., putIfAbsentComputeIfPresent(key, value, function), the new value. Value compute unit 812 may, in response to computing the new value, update the value within off-heap database 410. However, if the values are stored within on-heap database 408, as described with reference to FIG. 3B, then the new value may be updated within on-heap database 408.

FIG. 9A is an illustrative diagram of an exemplary data updater, in accordance with various embodiments of the present teaching. Data updater 510, in the illustrative embodiment, may include an update type identifier 900, a key-value pair determiner 902, a handle locator 904, a handle deletion detector 906, a compute function unit 908, a handle deletion changer 912, a chunk re-balancer 916, a removal unit 918, a deletion marker 920, and a lock implementer 922. In some embodiments, each of update type identifier 900, key-value pair determiner 902, handle locator 904, handle deletion detector 906, compute function unit 908, handle deletion changer 912, chunk re-balancer 916, removal unit 918, deletion marker 920, and lock implementer 922 may include one or more processors, memory, and a communication platform to facilitate the functionality associated with that component. For instance, the memory of each of update type identifier 900, key-value pair determiner 902, handle locator 904, handle deletion detector 906, compute function unit 908, handle deletion changer 912, chunk re-balancer 916, removal unit 918, deletion marker 920, and lock implementer 922 may include one or more computer programs that, when executed by the one or more processors, cause the corresponding component to perform a particular function or functions.

Update type identifier 900, in one embodiment, may be configured to determine a type of update associated with a given data update request received by data updater 510. In some embodiments, the types of data update requests may include, but are not limited to, compute-if-present operations and remove operations. Each of these operations will not insert a new entry into a particular memory chunk's entry array, and thus may be handled by data updater 510. In response to determining the type of request that was received, update type identifier 900 may provide the request to key-value pair determiner 902.

Key-value pair determiner 902, in some embodiments, may be configured to determine whether a given key-value pair, which may be specified by the data insertion request (e.g., computeIfPresent (key, value, function), is present within on-heap database 408. To do so, key-value pair determiner 902 may locate a memory chunk for the given key's entry using chunk identifier 502 and chunk index 504, as described above. If no key-value pair is present, meaning that no entry within any memory chunk exist, then the process may end and user device 402 may return false. However, if the key-value pair does exist, then key-value pair determiner 902 may notify handle locator 904 of their existence, as well as provide them information associated with their locations. For example, the pointers from that key's entry may be provided to handle locator 904.

Handle locator 904, in one embodiment, may be configured to locate a handle associated with a given key's entry within the handle index stored by on-heap database 408 (e.g., handle index 208). Handle locator 904 may determine, in some embodiments, that no handle is locatable within on-heap database 408. For example, the handle for a given value associated with a key may not exist yet. In this scenario, handle locator may return a false message to user device 402. However, a handle is found by handle locator 904, then handle locator 904 may provide the handle, or information indicating a location of the handle within on-heap database 408, to handle deletion detector 906.

Handle deletion detector 906 may be configured to determine whether the located handle is marked deleted. If handle deletion detector 906 determines that the handle is not marked deleted, then compute function unit 908 may be accessed to compute a new value based on the given function and the current value associated with that handle, which may be stored within off-heap database 410. In some embodiments, in response to determining that the handle exists and the handle is deleted, handle deletion detector may cause the key to be removed by performing a CAS operation. For example, handle deletion changer 912 may access CAS operation instructions 914 to cause the handle's index to be changed to the deletion marker. In some embodiments, deletion marker 920 may be accessed by handle deletion changer 912 with the CAS operation instructions 914 to cause the handle to be marked as deleted. In some embodiments, compute function unit 908 may be configured to compute a new value based on the current value stored within off-heap database 410, the function specified within the data update request, and compute model(s) 910. Compute model(s) 910 may, in some embodiments, be accessed by compute function unit 908 and may provide the operational instructions for how to perform the computation specified by the function.

In some embodiments, the removal of a key may cause a rebalancing of the chunk to occur. Chunk re-balancer 916 may be configured to determine whether the chunk needs to be rebalanced and, if so, may access chunk identifier 502 to facilitate the process of rebalancing the chunk. Chunk rebalancing is described in greater detail within commonly-assigned U.S. patent application Ser. No. 15/214,901, filed on Jul. 20, 2016, the disclosure of which is incorporated herein by reference in its entirety. Chunk-rebalancer 916 may further be configured to notify data updater 510 of the rebalance to synchronize the current (and future) operations. In this particular scenario, the data insertion operation may be published prior to the CAS operation being performed by handle deletion changer 912, which may be unpublished upon its completion. Compute function unit 908 may be configured to retry the compute operation if the CAS operation fails. Furthermore, if the entry was not found by key-value pair determiner 902 or if the handle associated with the entry is marked as deleted, then compute function unit 908 may return false to user device 402. If handle is not marked delete, and CAS succeeds, then handle deletion changer 912 may, in accordance with CAS operation instructions 914, cause the handle to be changed to be deleted.

In some embodiments, update type identifier 900 may determine that the received data update request corresponds to a remove request. In this particular scenario, update type identifier 900 may provide the remove request and any additional information to removal unit 918. Removal unit 910 may, in some embodiments, access handle deletion detector 906 to determine whether the handle specified in association with the request is marked as deleted. If not, then handle deletion changer 912 may indicate to deletion marker 920 that the handle is to be marked as deleted. Accordingly, deletion marker 920 may mark the handle as being deleted within on-heap database 408. Additionally, deletion marker 920 may be configured to mark the entry's handle index with the deletion marker. In some embodiments, deletion marker 920 may access lock implementer 922 to implement a read-write lock, as described above with reference to lock implementer 814. Furthermore, persons of ordinary skill in the art will recognize that any suitable locking technique may be employed by lock implementer 922. By marking the handle as deleted, data updater may prevent any other threads trying to perform an operation to that handle's corresponding key/value that the key has been removed, thereby preventing another thread from trying to read that key's value. Marking the handle index with the deletion marker allows for garbage collection to be performed. Furthermore, this allows for other threads trying to perform operations to save time as they may not need to read the handle and see that it is deleted in order to perform their task. If removal unit 918 receives notice that handle deletion detector 906 has found a deleted handle, then removal unit 918 may be configured to perform a deletion of the handle's representation with the handle index by causing deletion marker 920 to mark deletion for that handle within the handle index. This allows for data updater to ensure that, if the request is for a remove operation, that the corresponding entry's handle index is marked with the deletion marker prior to returning the deletion marker (e.g., remove succeeds, return True) to user device 402.

Figure 9B:
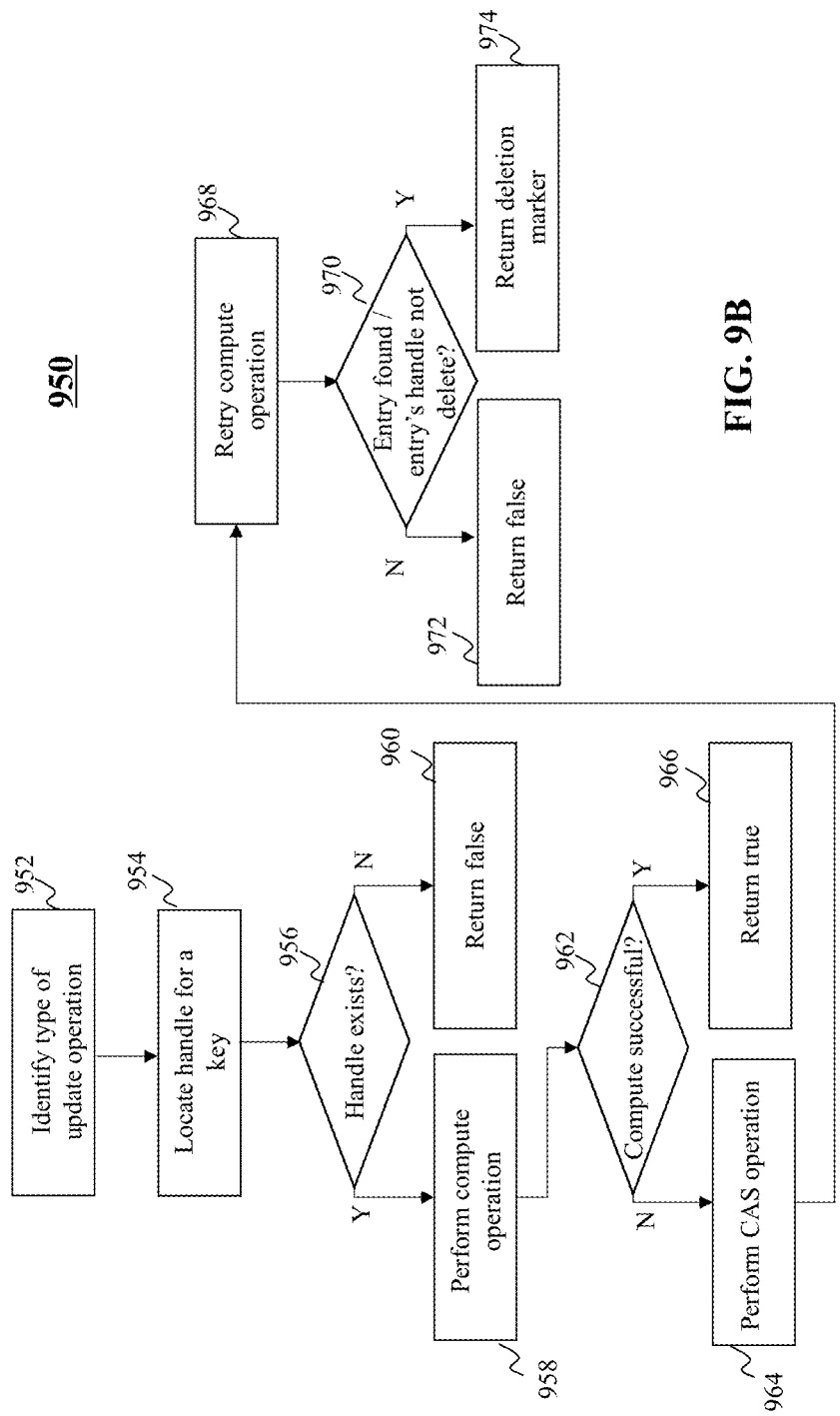
FIGS. 9B and 9C are illustrative flowcharts of exemplary processes for performing data update operations, in accordance with various embodiments of the present teaching.
Figure 9C:
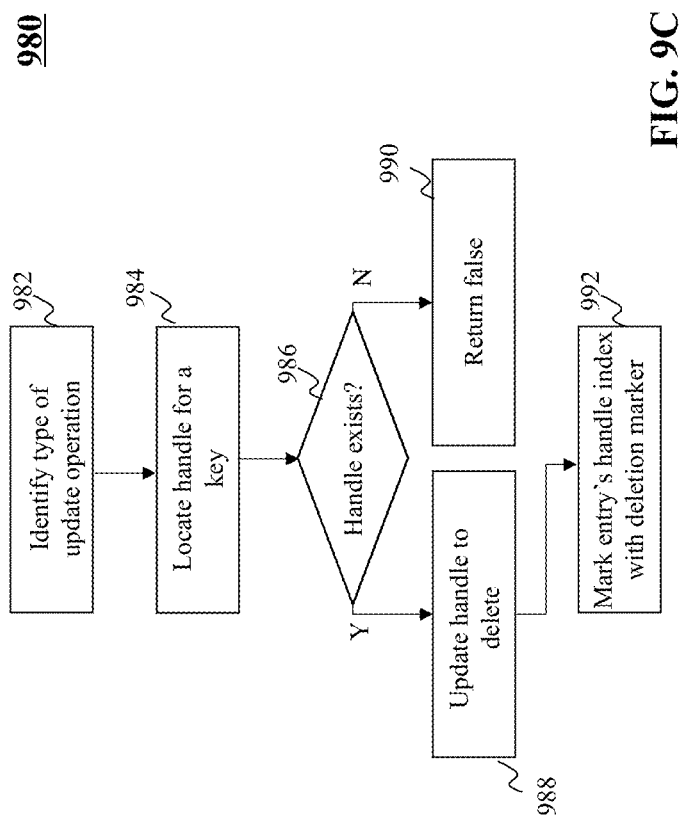

FIGS. 9B and 9C are illustrative flowcharts of exemplary processes for performing data update operations, in accordance with various embodiments of the present teaching. FIG. 9B is an illustrative flowchart of an exemplary process for performing a compute-if-present operation, in accordance with various embodiments of the present teaching. Process 950 may begin at step 952. At step 952, a type of update operation may be identified. For instance, a determination may be made that the operation requested corresponds to a compute-if-present operation. At step 954, a handle for a key specified by the request may be located. At step 956, a determination may be made as to whether the handle exists. If, at step 956, it is determined that the handle does not exist, then process 950 may proceed to step 960. At step 960, a false message is returned to the user device.

If, however, at step 956, it is determined that the handle does exist, then process 950 may proceed to step 958. At step 958, a compute operation may be performed. At step 962, a determination may be made as to whether the compute was successful. If so, then process 950 may proceed to step 966. At step 966, a true message, indicating that the compute operation succeeded, may be returned to user device 402. If, however, at step 962, it is determined that the compute operation was unsuccessful, then process 950 may proceed to step 964.

At step 964, a CAS operation may be performed. At step 968, the compute operation may be retried. At step 970, a determination may be made as to whether the entry was found or if the entry's handle was not marked deleted. If not, then process 950 may proceed to step 972. At step 972, a false message may be returned to user device 402. However, if at step 970 the entry is found or the entry's handle is marked deleted, then process 950 may proceed to step 974. At step 974, the deletion marker may be returned to user device 402.

FIG. 9C is an illustrative flowchart of an exemplary process for performing a remove operation, in accordance with various embodiments of the present teaching. Process 980 may begin at step 982. At step 982, a type of update operation may be identified. For instance, a determination may be made that the update type is a remove operation. At step 984, a handle for a key may be located. At step 986, a determination may be made as to whether the handle exists. If, at step 986, it is determined that the handle does not exist, then process 980 may proceed to step 990. At step 990, a false message may be returned to user device 402. If, however, at step 986, it is determined that the handle does exist, then process 980 may proceed to step 988. At step 988, the handle may be updated such that it is marked with the deletion marker. Process 980 may then proceed to step 992. At step 992, the entry's handle index may be marked with the deletion marker as well.

Figure 10:
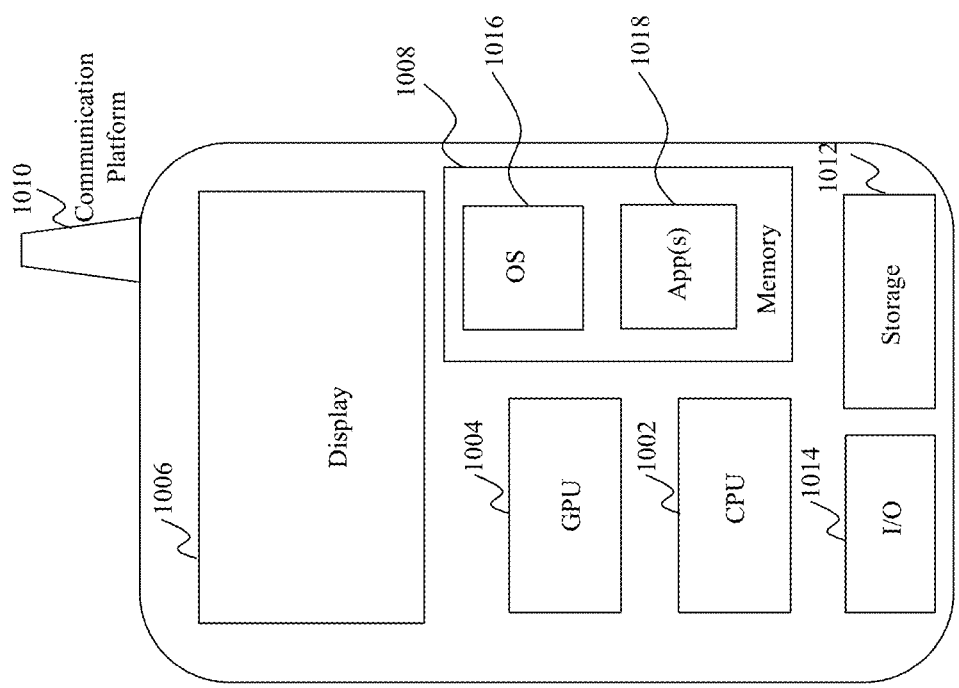
FIG. 10 is an illustrative diagram of an exemplary mobile device architecture that may be used to realize a specialized system implementing the present teaching in accordance with various embodiments.

FIG. 10 is an illustrative diagram of an exemplary mobile device architecture that may be used to realize a specialized system implementing the present teaching in accordance with various embodiments. In this example, the user device on which the requests are sent from may correspond to a mobile device 1000, including, but is not limited to, a smart phone, a tablet, a music player, a handled gaming console, a global positioning system (GPS) receiver, and a wearable computing device (e.g., eyeglasses, wrist watch, etc.), or in any other form factor. Alternatively or additional, mobile device 1000 may correspond to data operation engine 406 in one embodiment. Mobile device 1000 may include one or more central processing units ("CPUs") 1040, one or more graphic processing units ("GPUs") 1030, a display 1020, a memory 1060, a communication platform 1010, such as a wireless communication module, storage 1090, and one or more input/output (I/O) devices 1040. Any other suitable component, including but not limited to a system bus or a controller (not shown), may also be included in the mobile device 1000. As shown in FIG. 10 a mobile operating system 1070 (e.g., iOS, Android, Windows Phone, etc.), and one or more applications 1080 may be loaded into memory 1060 from storage 1090 in order to be executed by the CPU 1040. The applications 1080 may include a browser or any other suitable mobile apps for carrying out requests processing and/or sending on mobile device 1000. User interactions, such as request submissions, may be achieved via the I/O devices 1040 and provided to the data operation engine 406 via network(s) 404.

To implement various modules, units, and their functionalities described in the present disclosure, computer hardware platforms may be used as the hardware platform(s) for one or more of the elements described herein (e.g., user device 402, data operation engine 406). The hardware elements, operating systems and programming languages of such computers are conventional in nature, and it is presumed that those skilled in the art are adequately familiar therewith to adapt those technologies to appropriate settings as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 11:
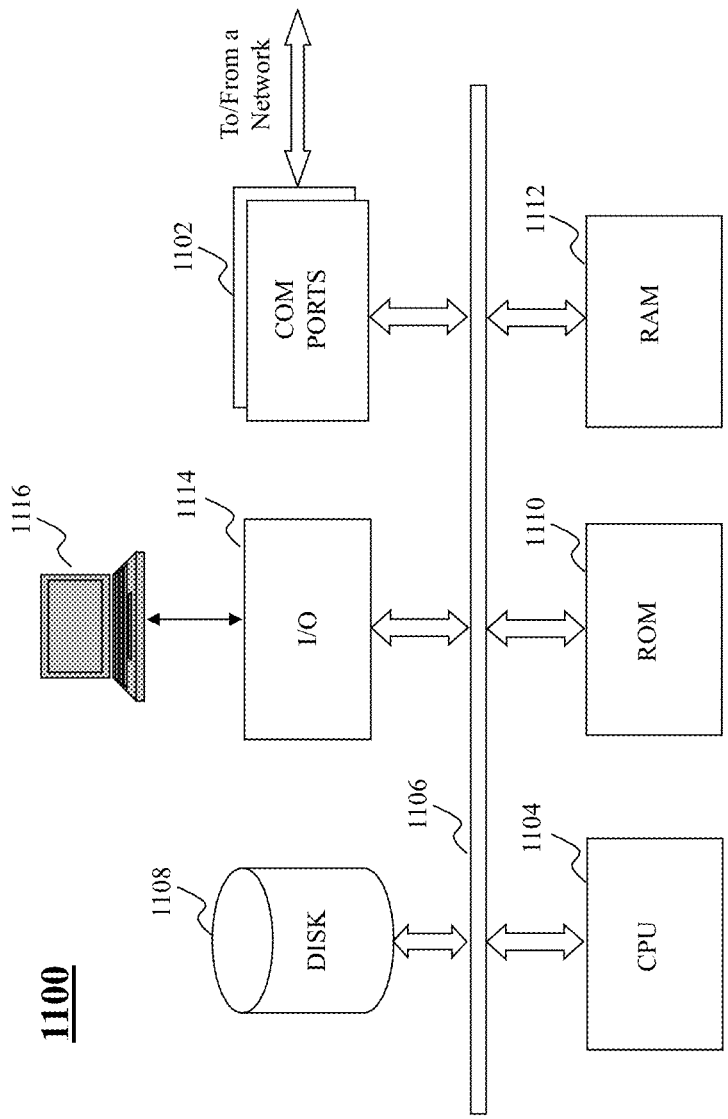
FIG. 11 is an illustrative diagram of an exemplary computing device architecture that may be used to realize a specialized system implementing the present teaching in accordance with various embodiments.

FIG. 11 is an illustrative diagram of an exemplary computing device architecture that may be used to realize a specialized system implementing the present teaching in accordance with various embodiments. Such a specialized system incorporating the present teaching has a functional block diagram illustration of a hardware platform, which includes user interface elements. The computer may be a general purpose computer or a special purpose computer. Both can be used to implement a specialized system for the present teaching. This computer 1100 may be used to implement any component of database operation engine 406 and/or user device 402, as described herein. For example, database operation engine 406 as described herein may be implemented on a computer such as computer 1100, via its hardware, software program, firmware, or a combination thereof. Although only one such computer is shown, for convenience, the computer functions relating to database operations as described herein may be implemented in a distributed fashion on a number of similar platforms, to distribute the processing load.

Computer 1100, for example, includes COM ports 1150 connected to and from a network connected thereto to facilitate data communications. Computer 1100 also includes a central processing unit (CPU) 11020, in the form of one or more processors, for executing program instructions. The exemplary computer platform includes an internal communication bus 1110, program storage and data storage of different forms (e.g., disk 1170, read only memory (ROM) 1130, or random access memory (RAM) 1140), for various data files to be processed and/or communicated by computer 1100, as well as possibly program instructions to be executed by CPU 1120. Computer 1100 also includes an I/O component 1160, supporting input/output flows between the computer and other components therein such as user interface elements 1180. Computer 1100 may also receive programming and data via network communications.

Hence, aspects of the methods of performing database operations and/or other processes, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, in connection with database operations engine systems. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the database operation techniques as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method for accessing data implemented on at least one computing device, each computing device comprising at least one processor and memory, the method comprising:
receiving a request associated with a key;
locating a memory chunk in a first memory site associated with the key;
determining an entry in the memory chuck corresponding to the key;
obtaining, from the entry, a first pointer and a second pointer, wherein the first pointer points to a first location in a second memory site where the key is stored, and the second pointer points to a second location in the first memory site where a handle is stored, wherein the handle is to be used to access a value associated with the key stored in the second memory site; and
retrieving, from a buffer at the second memory site, the key stored at the first location.

2. The method of claim 1, wherein:
the first memory site corresponds to an on-heap memory; and
the second memory site corresponds to an off-heap memory.

3. The method of claim 1, wherein the handle comprises a reference to the value associated with the key, the value being stored at a third location in the second memory site.

4. The method of claim 3, wherein the key and the value are stored in a buffer at the second memory site, the method further comprises:
obtaining, from the entry, the second pointer; and
obtaining, based on the handle, the third location of the value in the buffer, wherein the first location of the key comprises a location of the key within the buffer and the third location of the value comprises a location of the value within the buffer.

5. The method of claim 1, wherein:
the request indicates an operation to be performed with respect to the value associated with the key; and
the operation is to be performed based on the handle of the value associated with the key.

6. The method of claim 5, wherein if the operation corresponds to one of a data view operation or data update operation, the operation is performed when the handle indicates that the value associated with the key exists.

7. The method of claim 5, wherein if the operation corresponds to a data insertion operation, the operation is performed when the handle indicates that the value associated with the key is not present.

8. A system for accessing data, the system having at least one processor and storage, and the system comprising:
a request classifier configured to receive a request associated with a key;
a chunk locator configured to locate a memory chunk in a first memory site associated with the key; and
an entry searcher configured to:
determine an entry in the memory chunk corresponding to the key,
obtain, from the entry, a first pointer and a second pointer, wherein the first pointer points to a first location in a second memory site where the key is stored, and the second pointer points to a second location in the first memory site where a handle is stored, wherein the handle is to be used to access a value associated with the key stored in the second memory site, and
retrieve, from a buffer at the second memory site, the key stored at the first location.

9. The system of claim 8, wherein:
the first memory site corresponds to an on-heap memory; and
the second memory site corresponds to an off-heap memory.

10. The system of claim 8, wherein the handle comprises a reference to the value associated with the key, the value being stored at a third location in the second memory site.

11. The system of claim 10, wherein the key and the value are stored in a buffer at the second memory site, the entry searcher is further configured to:
obtain, from the entry, the second pointer; and
obtain, based on the handle, the third location of the value in the buffer, wherein the first location of the key comprises a location of the key within the buffer and the third location of the value comprises a location of the value within the buffer.

12. The system of claim 8, wherein:
the request indicates an operation to be performed with respect to the value associated with the key; and
the operation is to be performed based on the handle of the value associated with the key.

13. The system of claim 12, wherein if the operation corresponds to one of a data view operation or data update operation, the operation is performed when the handle indicates that the value associated with the key exists.

14. The system of claim 12, wherein if the operation corresponds to a data insertion operation, the operation is performed when the handle indicates that the value associated with the key is not present.

15. A non-transitory computer readable medium comprising one or more computer programs for accessing data, wherein the one or more computer programs, when executed by at least one processor of a machine, cause the machine to:
receive a request associated with a key;
locate a memory chunk in a first memory site associated with the key;
determine an entry in the memory chuck corresponding to the key;
obtain, from the entry, a first pointer and a second pointer, wherein the first pointer points to a first location in a second memory site where the key is stored, and the second pointer points to a second location in the first memory site where a handle is stored, wherein the handle is to be used to access a value associated with the key stored in the second memory site; and
retrieve, from a buffer at the second memory site, the key stored at the first location.

16. The non-transitory computer readable medium of claim 15, wherein:
the first memory site corresponds to an on-heap memory;
the second memory site corresponds to an off-heap memory;
the handle comprises a reference to the value associated with the key; and
the value being stored at a third location in the second memory site.

17. The non-transitory computer readable medium of claim 16, wherein the key and the value are stored in a buffer at the second memory site, and wherein the one or more computer programs, when executed by the at least one processor, further cause the machine to:

obtain, from the entry, the second pointer; and obtain, based on the handle, the third location of the value in the buffer, wherein the first location of the key comprises a location of the key within the buffer and the third location of the value comprises a location of the value within the buffer.

18. The non-transitory computer readable medium of claim 15, wherein:

the request indicates an operation to be performed with respect to the value associated with the key; and the operation is to be performed based on the handle of the value associated with the key.

19. The non-transitory computer readable medium of claim 18, wherein if the operation corresponds to one of a data view operation or data update operation, the operation is performed when the handle indicates that the value associated with the key exists.

20. The non-transitory computer readable medium of claim 18, wherein if the operation corresponds to a data insertion operation, the operation is performed when the handle indicates that the value associated with the key is not present.

* * * * *